US006910049B2

(12) United States Patent
Fenton et al.

(10) Patent No.: US 6,910,049 B2
(45) Date of Patent: Jun. 21, 2005

(54) SYSTEM AND PROCESS OF MANAGING MEDIA CONTENT

(75) Inventors: Nicholas W. Fenton, Los Angeles, CA (US); Michael F. Mannarino, Studio City, CA (US); Wendy Springer, Los Angeles, CA (US); Andrew Schneider, Los Angeles, CA (US); Marlowe J. Dayley, Los Angeles, CA (US); Alex Shmelev, Pacific Palisades, CA (US); Holly Thai, El Monte, CA (US); Jacob S. Manaster, Beverly Hills, CA (US); Rodney C. Newby, New York, NY (US); John Jeffrey Byer, Glendale, CA (US)

(73) Assignees: Sony Corporation, Tokyo (JP); Sony Pictures Entertainment, Inc., Culver City, CA (US)

( * ) Notice: Subject to any disclaimer, the term of this patent is extended or adjusted under 35 U.S.C. 154(b) by 484 days.

(21) Appl. No.: 09/906,023

(22) Filed: Jul. 13, 2001

(65) Prior Publication Data

US 2002/0194194 A1 Dec. 19, 2002

Related U.S. Application Data

(60) Provisional application No. 60/298,372, filed on Jun. 15, 2001.

(51) Int. Cl.[7] .............................................. G06F 17/00
(52) U.S. Cl. ................................... 707/104.1; 715/808
(58) Field of Search ............................ 707/104.1, 1–3, 707/6, 100, 102; 715/501.1, 762, 763, 808; 345/762, 763, 808

(56) References Cited

U.S. PATENT DOCUMENTS 5,673,316 A * 9/1997 Auerbach et al. ............. 705/51

6,081,262 A * 6/2000 Gill et al. ................. 715/500.1
6,178,413 B1 * 1/2001 Costin .......................... 707/1
6,311,194 B1 10/2001 Sheth et al.
6,341,290 B1 * 1/2002 Lombardo et al. ....... 707/104.1
6,345,256 B1 2/2002 Milstead et al.

(Continued)

OTHER PUBLICATIONS

Product Description pages for Sound Forge XP Studio 5.0 from website of Sonic Foundry (http://www.sonicfoundry.com); Nov. 13, 2001.
Product Descripition pages for Sound Forge 5.0 from website of Sonic Foundry (http://www.sonicfoundry.com); Nov. 13, 2001.
PCT International Search Report as issued in International Application No. PCT/US02/15822, Mailing Date Aug. 2, 2002.
PCT International Search Report as issued in International Application No. PCT/US02/15792, Mailing Date Sep. 3, 2002.

*Primary Examiner*—Uyen Le
(74) *Attorney, Agent, or Firm*—Foley & Lardner LLP

(57) ABSTRACT

A content management system and process for programming, scheduling, uploading, storing and managing content on a website. The content management system and process attaches meta-data to website elements and sorts the elements into a hierarchy based on the meta-data. The content management system and process may then perform off-line generation and association of all associated website elements, through the meta-data, into a data package. The data package may then be scheduled for on-line availability at defined times. The content management system and process also enables the setting forward of an internal clock so that the data package may be tested within the context of the website before the data package may actually be available on the website. The content management system and process may automatically ingest content based on a naming convention and may also ingest website user content and inherit all meta-data that was associated with user content.

59 Claims, 13 Drawing Sheets

U.S. PATENT DOCUMENTS

| | | |
|---|---|---|
| 6,370,562 B2 | 4/2002 | Page et al. |
| 6,374,260 B1 * | 4/2002 | Hoffert et al. ............ 707/104.1 |
| 6,453,339 B1 * | 9/2002 | Schultz et al. .............. 709/206 |
| 2002/0052885 A1 | 5/2002 | Levy |
| 2002/0059120 A1 | 5/2002 | Milton |
| 2002/0083006 A1 | 6/2002 | Headings et al. |
| 2002/0091792 A1 | 7/2002 | Janniello et al. |
| 2004/0088259 A1 * | 5/2004 | Celik ......................... 705/50 |

* cited by examiner

FIG. 5

Create/Edit/Duplicate Popper — 802

Please fill in all fields to set page characteristics.

Popper Title — 804

Popper Name — 806

Project — 808

Genre/Sub-Genre — 810

Availability 826 — 03/22/2001 12:00:00 - 05/21/2001 12:00:00
06/01/2001 12:00:00 - 08/01/2001 12:00:00 — 828, 824, 830

Date/Time — 816, 818, 820, 822

Type/Template — 812

Template Desc — 814

Episode # — 856

Clip # — 858

Guide Icon: — 852
- ● connect  ○ create  ○ experience  ○ buy

Copyright — 832

Credits — 834

Author/Artist — 836

Summary — 838

Description — 840

Project Title — 842

File Type — 844

File Sub Type — 846

Project Image — 848

External Link — 850 iPromotable [x]  Searchable [x]  Browsable [x]
Downloadable [x]  Streamable [x]

Create/Edit/Duplicate Individual Promote

This template has content requirements; please place images/video/text/etc... to complete.

Points To | view page/popper library
<popper or page>

Promote Title

Promote Name

Rollover Text

Related Link Text

Promote Type:
- ● Giant  ○ Large  ○ Medium  ○ Small
- ○ Petite ○ Zone   ○ Feature ○ Related Link Image | view image library Rollover Image | view image library

FIG. 11

Create/Edit/Duplicate Page

Please fill in all fields to set page characteristics.

- Page Title
- Page Name
- Genre/Sub-Genre
- Type/Template
- Template Desc.
- Keywords
- Project Title
- Guide Icon: ○ connect ● create ○ experience ○ buy
- Promotable ☐  Searchable ☒  Streamable ☐  Browsable ☐  Downloadable ☐
- Author/Artist
- Credits
- Summary
- Description
- File Type
- File Sub-Type Schedule: 03/22/2001 12:00:00 – 05/21/2001 12:00:00
06/01/2001 12:00:00 – 08/01/2001 12:00:00

SYSTEM AND PROCESS OF MANAGING MEDIA CONTENT

RELATED APPLICATIONS

This application claims priority to Provisional Application No. 60/298,372, filed Jun. 15, 2001, which is hereby incorporated by reference. The present application also relates to a co-pending U.S. utility patent application entitled "Media Content Creating and Editing System and Process," U.S. Pat. Ser. No. 09/906,024 filed Jul. 13, 2001, the content of which is also incorporated by reference herein.

BACKGROUND OF THE INVENTION

1. Field of the Invention

The present invention relates generally to systems and processes for managing media content, and, in particular embodiments, to a content management system and process for managing a broadband creativity platform for creating, editing, sharing and publishing of media content online.

2. Description of Related Art

In modern network environments, including the Internet, various forms of media content are made available to network users. For example, Internet users may access a variety of Internet sites in order to play electronic files containing music, videos, images, photos, or other media content, for example, on a media player. Typically, the size of such files is large. Also, typically, Internet sites dynamically generate, on-line, the media player pop-up windows and other website elements (for example, Web pages) used to present such media content when it is accessed by an Internet user. Thus, long access delays are not unusual when such media content is accessed by an Internet user. Furthermore, many Internet websites' Web pages contain Flash animation, which may be dynamically generated on-line when accessed by a website user. Again, this results in long access delays.

In addition to long access delays, the complexities involved in programming and managing the delivery of such media content and Flash animation on a website may be overwhelming and may involve higher costs resulting from the need for programming and website administration professionals.

The success of a website offering such media content and Flash animation on the Internet may depend, at least in part, on the ease and speed with which a website administrator may create, edit, duplicate, and generate Web pages, pop-up screens, and other website elements. The success of a website may further depend on shorter media content file and Web page access delays. Furthermore, the success of a website may depend on more efficient management of the media content on the website, and satisfactory security for files stored in the website file storage system.

Websites that entail complex programming tasks, and inefficient media content file management systems, as well as websites having insecure file storage systems, may have difficulty in competing in today's Internet environment. Furthermore, programming errors and security breaches may result in prolonged downtimes for a website.

Therefore, there is a need for a content management system and process which provides for efficient and rapid generation of Web pages and other website elements with a minimum of programming complexity. Furthermore, there is a need for a content management system and process which manages media content files more efficiently. In addition, there is a need for a content management system and process which provides better security for files stored in the website's file storage system.

SUMMARY OF THE DISCLOSURE

Embodiments of the present invention overcome problems in the existing art as described above by providing a content management system and process which attaches meta-data to website elements and which sorts website elements into a hierarchy.

Embodiments of the invention may operate within an online environment including one or more user network devices and one or more server network devices connected by a communications link to the one or more user network devices.

Further embodiments of the present invention provide a content management system and process which automatically uploads and ingests media content located on a network drive based on a naming convention.

Further embodiments of the present invention provide a content management system and process which enables website administrators to set an internal clock forward in order to take a snapshot of the website at a future time.

Further embodiments of the present invention provide a content management system and process which comprises a hierarchy of approval levels for approving website elements for generation.

Further embodiments of the present invention provide a content management system and process which enables a website administrator to ingest a website user's media content into a database and which attaches meta-data to the user's media content.

Further embodiments of the present invention provide a content management system and process which uploads and stores a website user's media content to a database by assigning a random number to the media content.

Further embodiments of the present invention provide a content management system and process which enables a website administrator to package multiple pieces of media content into one logical unit.

In one embodiment, the content management system and process manages a website accessible to the user through a web browser which displays to the user a number of Web pages and other programmed elements which facilitate a media content creating and publishing process by allowing the user to create and edit media content items, store the media content items in a user storage area, manage the media content items within the user storage area, share media content items with other users, and configure and manage user showcase pages to display the user's media content items.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

Referring now to the drawings in which like reference numbers represent corresponding parts throughout:

FIG. 5 shows an exemplary content management system Create/Edit/Duplicate Project page, according to an embodiment of the invention;

FIG. 8 shows an exemplary content management system Create/Edit/Duplicate Popper page, according to an embodiment of the invention;

FIG. 11 shows an exemplary content management system Create/Edit/Duplicate Individual Promote page, according to an embodiment of the invention;

FIG. 12 shows an exemplary content management system Create/Edit/Duplicate Page page, according to an embodiment of the invention;

DETAILED DESCRIPTION OF EMBODIMENTS OF THE INVENTION

Figure 1:
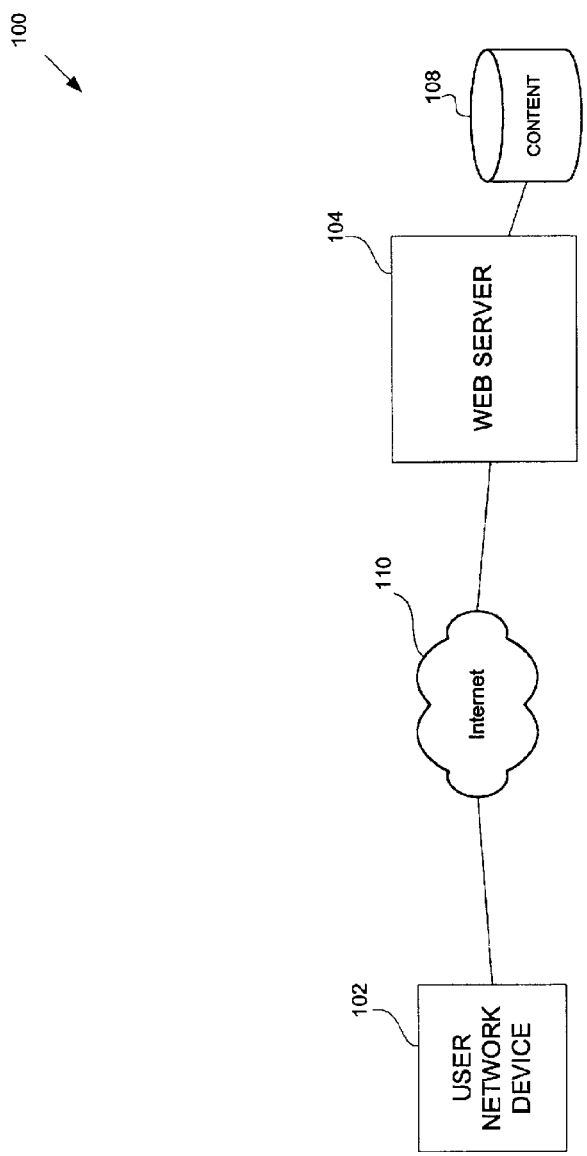
FIG. 1 is a simplified view of an exemplary client-server environment in which a system and process according to embodiments of the invention may be employed.

In the following description of embodiments of the invention, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Embodiments of the present invention relate to a content management system and process for programming, scheduling, uploading, storing and managing content. In one embodiment, the content management system and process programs, schedules, uploads, stores, and manages content in the context of a broadband creativity platform for creating, editing, sharing, and publishing of media content items online.

In example embodiments, the broadband creativity platform is implemented as a website on which users are provided with digital assets and tools required for on-line and off-line creating and editing of media content items, as well as tools for sharing media content items between users, and for on-line publishing of media content items. The term "digital assets" is used herein to refer to media content made available for use by a website user in the user's own media creations. The terms "media content" and "media content item" are used herein to refer to all forms of electronic content (i.e., content that may be read or processed in an electronic form), including, but not limited to, digital video, audio, photos, graphics, text, and animation.

Embodiments of the content management system and process provide one or more functions including, but not limited to: (1) enabling website administrators to program, schedule, and manage website elements including, but not limited to projects, poppers, promotes, and pages; (2) attaching meta-data to website elements and sorting website elements into a hierarchy; (3) automatically uploading and ingesting media content based on a naming convention; (4) enabling website administrators to set an internal clock forward in order to take a snapshot of the website at a future time; (5) enabling website administrators to approve website elements based on hierarchical approval levels; (6) generating website elements approved at the highest approval level; (7) ingesting a website user's media content into a database and attaching meta-data to the website user's media content; (8) uploading and storing a website user's media content to a database by assigning a random number to the media content; and (9) packaging multiple pieces of media content into one logical unit.

An embodiment of the content management system and process may be employed in a network of computer systems. The components of the network may be interconnected across a wide area network, such as, but not limited to, the Internet. At the top level, server network devices ("servers") support the operation of the broadband creativity platform and store digital assets and other media content that may be accessed by users of the platform. The digital assets and other media content may be licensed from independent providers by the website or owned by the website. The servers also reserve storage space for user-created content that may be created and uploaded by the user to the platform.

The website may contain a homepage and a tree of numerous additional Web pages inter-linked with the homepage at the root. The pages of the website may be of various types, such as, but not limited to user settings pages, user profile pages, user showcase pages, user biography ("bio") pages, channel (genre) pages, and zone pages. Users may also activate, view, and utilize the functionality of pop-up screens ("poppers") within pages including, but not limited to, audio poppers, video poppers, and tool poppers. The user may browse through the website by following links within the pages of the website or by using various tools, such as, but not limited to, a search tool, a graphic guide to media content on the platform, user selectable operators such as virtual buttons (designated selectable icons or areas) and menus, lists, and the like.

All media content items on the site, from whatever source, may be associated with "meta-data" (i.e., description or classification data regarding the media content items that may be entered by the user or website administrators), which may be used by the content management system and process to upload, store, organize, and manage the media content items. For example, media content search and guide functions may be implemented using this meta-data. The user can search for media content items on the website based on certain meta-data associated with the media content items, such as, but not limited to, media content item type, media content item keywords, and the media content item creator.

The website's homepage contains links to other pages on the website, as well as to other websites. Users may manage favorite links by accessing, adding and deleting favorite links. In one embodiment, the homepage may contain user-selectable operators for selecting a desired functionality. The homepage may also contain user-selectable promotional areas ("promotes") which may be, for example, graphic images that are linked to the promoted page, popper, advertisement, website, or other promoted entity.

Systems and processes according to example embodiments of the present invention may be employed to organize and manage a website on which digital assets and tools are made available to users of the website who have registered and logged on to the website. In one embodiment, users may subscribe (for example, pay a fee) in order to obtain access to the digital assets and tools that are available. In other embodiments, scaled-down versions of digital assets and tools may be made available to the registered or un-registered users of the website at no charge. Full-versions of these tools may be purchased or leased from the website for a fee.

In some embodiments, media creation and editing tools may be accessed and downloaded by the user for on-line or off-line creation and editing of the user's own media content items. Media content items created by website users may be uploaded to the website and stored in a storage area made available to users. These stored media content items may be organized and managed by the user in various ways, such as, but not limited to, defining, sorting, searching, sharing, and deleting the stored media content items.

In some embodiments, the website may also provide to the user a "showcase page" on which to display this content to other users of the platform, for example, in templates with pre-defined styles. The showcase page may be viewable by other users of the platform. The showcase page may be linked to a user "biography page" where the user may display personal and other information to other users. In one embodiment, if media content items displayed on a user's showcase page are particularly compelling, website administrators may choose to "ingest" those media content items into the main display pages of the website, using the content management system and process.

In one embodiment, the homepage contains user-selectable operators which provide to the user the choice of "experiencing," "creating," or "connecting" media content on the website. Depending on the user's purpose, the user may choose one of these three operators.

When a user chooses to "experience" media content, the user may experience (i.e., view, hear, or otherwise perceive) media content licensed from independent sources, as well as media content that has been created by users of the website. In one embodiment, when the user chooses to experience media content, the user may be presented with a further choice between various user-selectable operators, each linked to a particular channel home page A channel home page may be the main page on which a particular genre of media content (for example, comedy, drama, action, science fiction, horror, or music) is presented. This main page contains promotes that link to other pages or present media content to the user.

When a user chooses to "create" media content, the user may be provided access to media creation and editing tools to create and/or edit media content. The user may also be provided with digital assets in the form of "asset packs." These asset packs may contain, for example, video and audio segments that may be incorporated into or combined with the user's own media content. For example, each asset pack may comprise audio and video segments related to a particular genre. As an example, an "action" asset pack may comprise video and/or audio segments of explosions, car chases, and gun battles. Similarly, a "comedy" asset pack may comprise video and/or audio segments of stand-up comedians, skits from television and radio shows, and scenes from comedy films. As an additional example, a "music" asset pack may contain video and/or audio segments of music being played by popular musical groups. Using media creation and editing tools, the user may insert video, animation, audio and other digital media into, for example, pre-defined templates and timelines.

The channel home pages may comprise user-selectable operators that link to digital assets associated with the genre on that channel home page. Thus, for example, the user can experience the action channel home page and then select a create user-selectable operator on that page which may link the user to an action asset pack. The action asset pack may contain, for example, video, audio, and animation segments of action scenes, including, but not limited to, explosions, car chases, and fight scenes. The user may then use the action segments in the user's own creations. As an example, the user may have video showing a child falling off a bike. The user may insert a video segment of an explosion obtained from the website at the point in the user's video where the child falls. The user may then display this video on the user's own user showcase page on the website.

When a user chooses to "connect" media content, the user may, for example, be presented with an upload page or popper wherein the user may enter information about the media content (meta-data). The media content may then be uploaded to the user's showcase page on the website. The user showcase page may be accessed, in one embodiment, by entering the website's Uniform Resource Locator ("URL") followed by "USERNAME," where "USER-NAME" is a name unique to the user associated with the showcase page. A particular user's showcase page may then be accessible to other users of the website who enter that user's user name after the website's URL. Thus, the user may connect with other users of the website by having a showcase page on which to display the user's creative media content and by being able to search for and access other user's showcase pages.

System Hardware Environment

FIG. 1 is a simplified view of an exemplary client-server environment 100, such as the World Wide Web (the Web), in which the content management system and process may be implemented. The architecture of the Web follows a conventional client-server model. The terms "client" and "server" are used to refer to a computer's general role as a submitter of requests for data (the client) or provider of data (the server). The client, also referred to as User Network Device ("UND") 102, and Web server 104 communicate using a protocol such as HyperText Transfer Protocol (HTTP). In the Web environment, Web browsers reside on clients and render Web documents (pages) served by the Web servers. The client-server model is used to communicate information between UND 102 and Web server 104.

Web server 104 is coupled to a network 110, for example the Internet, and responds to document requests and/or other queries from Web clients. Other embodiments may employ other networks. While the actual sequence of events and operation of the main pages of the website vary with different embodiments, in one example embodiment a user first connects to the website using a web-browser, such as Netscape Navigator or Internet Explorer. The user may then log into the website with a user identifier and password or may log in as a guest. A new user may also register with the website to establish a user identifier and password.

During the login process and registration, the main website may derive information about the user's processor or computer system to provide proper support for the user's interaction (for example, to determine the optimum bandwidth to use). When a user selects a document by submitting its URL, the Web browser opens a connection to Web server 104 and initiates a request (e.g., an HTTP get) for the document. Web server 104 delivers the requested document, typically in the form of a text document coded in a standard markup language such as HyperText Markup Language (HTML) or Dynamic HTML (DHTML). Additionally, website pages may be coded in Java, JavaScript, Flash, or any other suitable programming or scripting language.

UND 102 may be any type of computing device such as, but not limited to, desktop computers, workstations, laptops, and/or mainframe computers. Additional variations may also be implemented such as interfaces for wireless telephones, PDAs, media players, and for satellite download capability. One or more users (not shown) may be associated with each UND 102.

The UND 102 may also include software, hardware, firmware or combinations thereof, for converting digital content into user-perceptible media content. When a UND 102 is connected in communication with the server 104, the website may be displayed, on a display device (not shown) connected locally to UND 102, as a user interface for allowing a user to receive user-perceptible information from the server 104 and communicate information to the server 104, including, but not limited to, requests for media content downloads, uploads, or requests to link to additional pages, poppers or other websites.

Web server 104 may also be any type of computing device such as, but not limited to, desktop computers, work stations, laptops, and/or main frame computers. In website embodiments, the server 104 may include or operate with a memory system 108 for storing website content, comprising data for creating or generating text, images, designs or other indicia that compose one or more website "elements," including, but not limited to, showcase pages, user biography pages, "channel (genre) pages", "zone pages," poppers, and promotes. Website elements stored on memory system 108 may further include media content items supplied by the website, as well as "personalized media content items" (i.e., media content items selected by, created by, or edited by the user). Web server 104 may be connected to a local display device (not shown) for displaying website elements to website administrators for purposes including, but not limited to, programming, managing, testing, and maintaining the website.

System and device functions and processes described herein may be implemented with machine-executable instructions. Software comprising these instructions may be used to program and cause general-purpose or special-purpose processors to perform the functions and processes described herein. Alternatively, such functions and processes may be implemented by firmware, hardware comprising hardwired logic, or by any combination thereof.

In one example embodiment, users may be provided with computer program products comprising a machine-readable medium storing software for programming a computer (or other UND as described above) to perform processes carried out by the UND relating to the creating, editing, sharing, and publishing of media content items, according to the embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

In another example embodiment, UNDs are programmed with software downloaded to the UNDs as computer program products. The software, for example, media creating and editing tools, may be downloaded or transferred from a remote processor (for example, a server) to a requesting processor (for example, a UND) by way of data signals embodied in a carrier wave or other propagation medium via a communication link (for example, a modem or other wired or wireless network connection, a satellite signal receiver or other broadcast signal receiver, or the like). The user may connect to the website across the Internet, using UND 102. In one embodiment, UND 102 may employ standard Web-browsing software to connect to and interact with the website. In other embodiments, customized software, hardware, firmware or combinations thereof, may be employed by UND 102 for interacting with server 104. The user may connect to the website by, for example, connecting to the address or URL associated with the website.

Content Management System And Process Overview

Website administrators program, schedule, and manage the website via a Content Management System ("CMS"). The CMS organizes the website elements (for example, projects, pages, poppers, links, promotes, and digital assets) into a hierarchy. Meta-data is associated with parent elements within the hierarchy. The parent elements within the hierarchy may then pass the meta-data to child elements within the hierarchy that are associated with the parent elements as the child elements are programmed by website administrators.

As an example, a project may be a particular show that is available on the website. A project may also be, for example, a particular channel (genre) such as comedy, drama, action, or science fiction. The project may be associated with various website pages. The pages may, in turn, display various elements that are also associated with the project. For example, promotes may be included on the pages which may provide links to various project-related elements including, but not limited to, pages, poppers, advertisements, digital assets, media creating and editing tools, and other project-related websites. Video and/or audio poppers linked to the project promotes may display to the user in a user-perceptible form media content that is linked to the poppers. In addition, other links to the various project-related elements may be included on the pages and/or in the associated poppers. These other links may include, for example, text links and graphic links.

Figure 2:
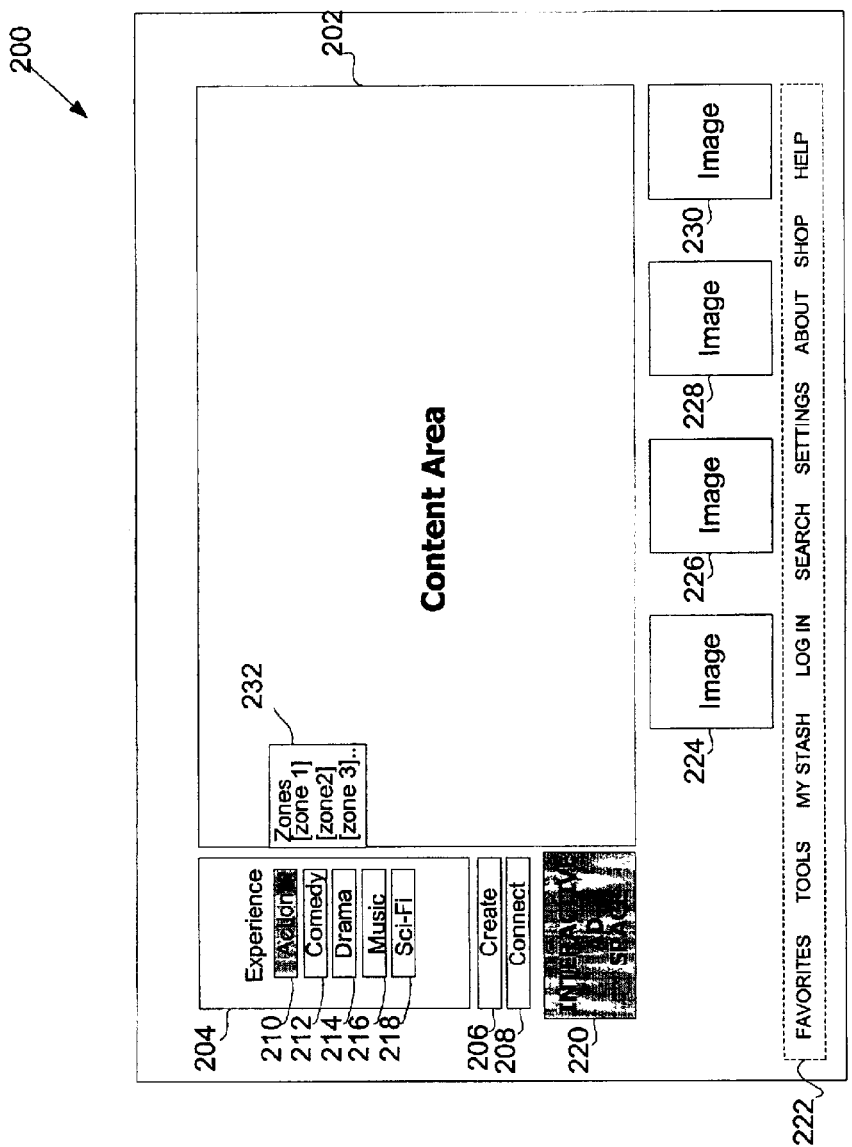
FIG. 2 shows an exemplary content management system action channel home page, according to an embodiment of the invention.

FIG. 2 shows an example of a website page 200 associated with an "action" channel project. Exemplary website action channel page 200 comprises content area 202, "experience" channel area 204 (comprising user-selectable operators 210 (action), 212 (comedy), 214 (drama), 216 (music), and 218 (science fiction) for selecting a genre of media content), a "create" user-selectable operator 206, a "connect" user-selectable operator 208, interactive advertising space 220, menu area 222, and promotes 224, 226, 228, and 230.

Content area 202 may comprise a promote which may link the user to, for example, other pages or poppers within the website. The promote, alternatively, may link the user to other websites. Interactive advertising space 220 may display to the user advertisements for companies, services and products. The interactive advertising space 220 may comprise a broadband advertising unit that slides on-screen and off-screen at pre-determined intervals and/or may be made to appear on-screen through some action of the user, for example, by clicking or otherwise selecting tabs that may be displayed along the periphery of the screen.

The menu area 222 may comprise menu choices including, but not limited to, "favorites" (a link to areas, pages, or media content items that are of interest to the user and that the user has previously designated as favorites), "My Stash" (a link to media content that the user has previously saved to a storage area ("stash") provided to the user by the website), "Log in" (links to a log in page so that the user may log into the website), "search" (links to a search page so that the user may perform searches based on user-defined criteria), "settings" (links to a settings page so that the user may enter and edit settings such as the user's password and user name), "about" (links to about pages that provide the user with information about the website), and "shop" (links to shopping pages on which the user may purchase merchandise offered by the website or by independent vendors).

Channel page 200 may further comprise user-selectable promotes 224, 226, 228, and 230. Promotes 224, 226, 228, and 230 may, for example, link the user to action digital asset packs that the user may download and edit for use within user-created media content. Alternatively, promotes 224, 226, 228, and 230 may link the user to other pages, poppers, or websites with action themes or to website shopping pages where the user may purchase action theme merchandise.

In some embodiments, when a user rolls over (for example, with the mouse cursor) a genre user-selectable operator, the user may be presented with a list of genre zone pages that may be clicked or otherwise selected by the user. The genre zone pages may be particular shows or other events available to the user which correspond to the particular genre, for example, action shows. List 232 is an example of such a genre zone page list. List 232 may be displayed to the user when the user rolls over the action user-selectable operator 210 in experience area 204 and may comprise a number of action-related shows (for example, 3) that the user may choose to experience.

Similarly, in some embodiments, when a user rolls over (for example, with the mouse cursor) one of the promotes, the user may be presented with "rollover text" and/or a "rollover image." The rollover text may, for example, describe the promote or provide other information to the user about the promote when the user rolls over the promote. The rollover image may, for example, be an image related to the promote in some way, for example, if the promote is linked to an "action" asset pack, the rollover image may be, for example, an image depicting an explosion.

When website administrators program a project offline through the CMS, they may assign meta-data to the project. The meta-data may be data describing or classifying the overall project. Examples of meta-data include, but are not limited to, a project title, a description of the project, the project creator(s), credits for the project, copyright information, keywords associated with the project, project genre (for example, comedy, drama, horror), and project sub-genre (for example, romantic comedy or gothic horror).

The meta-data may be used by the CMS to store, organize, and manage the project. For example, store and search functions may be implemented using this meta-data. Thus, a website administrator may store a particular project in a database and search for the particular project within the database based on certain meta-data associated with the project.

After the parent project is programmed and meta-data is assigned to the project, website administrators may program poppers and associate them, through the CMS, with the parent project. The CMS may automatically pass to the associated child poppers the meta-data assigned to the parent project. Thus, this meta-data does not have to be re-entered for poppers associated with the parent project (the popper meta-data may, however, be edited by website administrators). The website administrators may then generate the poppers off-line, i.e., integrate the data associated with the popper into a media player interface.

Similarly, after the poppers are programmed and generated off-line, promotes or other links (for example, text links) may be programmed which link to and initiate the popper window comprising the media player interface. These promotes may inherit the parent project meta-data from the poppers with which they are linked. Again, this meta-data may not have to be re-entered for promotes linked to poppers associated with the parent project (the promote meta-data may, however, be edited by website administrators). The website administrators may then generate the promotes off-line, i.e., tie the image or other indicia used for the promote to the popper link.

Finally, when the website administrators program project pages off-line via the CMS, the project meta-data may be inherited by the associated project pages. When website administrators generate the project pages offline, the CMS automatically ties together, through the project meta-data, all the various child elements associated with the parent project. Thus, the generated project pages are automatically populated with the various child elements. Therefore, when a website user accesses a project page on-line, the page may not have to be dynamically generated at that time, because the page was previously generated off-line by the website administrators. This results in significantly improved access time.

Thus, the inheritance of meta-data within the hierarchical structure may facilitate the off-line generation of website pages which comprise elements from different hierarchical levels. The various elements may be linked together by website administrators into a "data package" by means of the meta-data. This packaging by meta-data facilitates the off-line dynamic generation of website pages which include various linked elements.

In addition to facilitating the off-line dynamic generation of website pages, the CMS enables website administrators to search through elements stored in a database, create and link new elements, and to edit previously created elements. The CMS also enables the website administrators to schedule the time that elements may be available on the website ("availability"). The CMS also facilitates quality assurance ("QA") tasks performed by Website administrators by allowing the administrators to set an internal clock forward to a certain date and time and take a "snapshot" of the website based on that date and time.

In one embodiment, the media content files may be stored in a database associated with the website. Each media content file within the database may be associated with a unique identifier. The unique identifier may comprise a number of data fields, each data field comprising a number of bits. For example, in one embodiment, the unique identifier comprises 8 data fields, the 8 data fields each comprising from 3 to 6 bits.

Each data field may represent particular types of information about the media content file. For example, one of the data fields may contain the title of the media content. Another data field may, for example, contain the episode number for media content comprising a number of episodes. Yet another data field may represent the file type (for example, audio or video).

In one embodiment, new or updated media content residing on a website network drive may be automatically ingested into the website's live directory based on the unique identifier, either on a periodic basis or at a time selected by a website administrator. At the time of ingestion, the CMS may read and parse the unique identifier of the ingested media content and assign the media content to the website's live directory based on the information contained in the unique identifier. The CMS may also create a reference file of a particular size, for example, a one kilobyte file, that may be stored in the database and associated with the ingested media content file. The website administrator may then enter meta-data information regarding the media content file into the reference file.

As discussed above, in some embodiments, the website may reserve and assign storage space in a database for personalized media content items that a user may upload to the website. When uploading the media content, users may enter meta-data for the media content (for example, in free text-entry boxes that appear in pop-up windows displayed to the user during an upload process). The user-supplied meta-data may be used by the CMS to store, organize, and manage the user's media content.

In some embodiments, when user content is uploaded and stored in the reserved storage space (for example, in memory system 108, shown in FIG. 1), it is not stored in a conventional hierarchical file system, but instead is stored in a database of files for which the CMS maintains references. These files are not stored in sorted order based on user name or upload date, but instead are given a pseudo-random name or number and placed in a pseudo-random manner within the storage space. One of the advantages of this file system is that it may make it more difficult for hackers to access a particular website user's files. Furthermore, because many users share the same database for storing their media content files, it is advantageous to designate the stored files by pseudo-random names or numbers to avoid conflicts between filenames supplied by website users for their media content.

In some embodiments, the user may take media content stored in their storage space and display the media content to other website users, for example, on a showcase page. The showcase page may be viewable by other users of the platform. In one embodiment, if media content items displayed on a user's showcase page are particularly compelling, website administrators may choose to "ingest" those media content items into the main display pages of the website, using the content management system and process.

In one embodiment, website administrators may ingest the user's media content into the main display pages of the website by adding, for example, a "user_" prefix to the desired media content files located in the user's storage space. The CMS may then locate the desired files in the user's storage space based on the prefix and ingest the media content into the website's main display pages. The media content may be ingested into the website by the automatic population of relevant fields of data structures with meta-data entered by the website user at the time the user's media content was selected, created, or edited.

Content Management System User Interface

Figure 3:
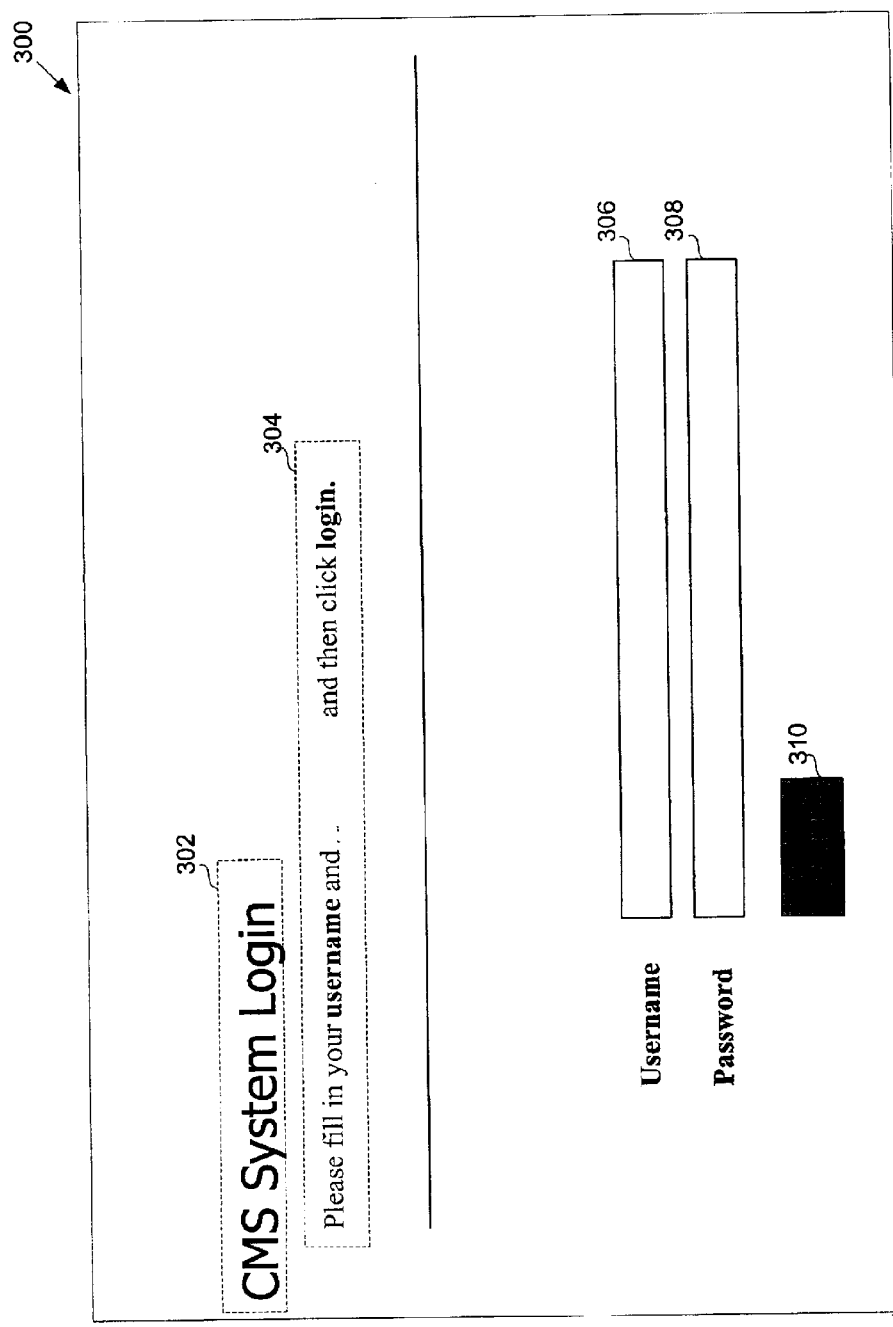
FIG. 3 shows an exemplary content management system System Log in page, according to an embodiment of the invention.

In one embodiment, when a website administrator accesses the CMS user interface, the administrator may be required to log in to the CMS. FIG. 3 shows exemplary Log in page 300. Static text area 302 may display the page description. Static text area 304 may display instructions for the log in page. The website administrator may be required to enter their website username into "Username" free text entry box 306. The website administrator may also be required to enter their website password into "Password" free text entry box 308. The website administrator may then click on or otherwise select "Login" user-selectable operator 310. If log in is successful, the website administrator may be presented with the CMS homepage.

Figure 4:
FIG. 4 shows an exemplary content management system Global Navigation page, according to an embodiment of the invention.

Exemplary CMS Global Navigation page 400 is shown in FIG. 4. Static text area 402 may display the page description. A system menu 404 of selectable options is displayed to the website administrator. In some embodiments, website administrators may have one of a number of possible CMS access levels that may limit the actions that the administrator may take on the CMS. In these embodiments, the options displayed in menu 404 may correspond to the permissible actions of the current website administrator.

The system menu 404 enables the website administrator to navigate among the various options available on the CMS user interface. Through use of the various options on system menu 404, the website administrator may navigate among various pages which may be used to program, schedule, upload, store, and manage website elements.

CMS function pages are accessible from system menu 404 on which a website administrator may create, edit, duplicate, and search for projects, digital assets, poppers, promotes, pages, external links (for example, links to other to other websites), and links to advertisements. Pages are also available where the website administrator may schedule the times that individual elements may be accessible on the website. Furthermore, pages are available to enable the website administrator to store the elements in a database or upload elements from the database.

To demonstrate one embodiment of the CMS user interface, the process of creating and generating the action channel homepage 200 (shown in FIG. 2) will be described in detail. Assuming that a project with which the action channel homepage 200 may be associated does not already exist, the website administrator first may create a new project by clicking or otherwise selecting the "New" under the "Project" heading on system menu 404.

Figure 5:
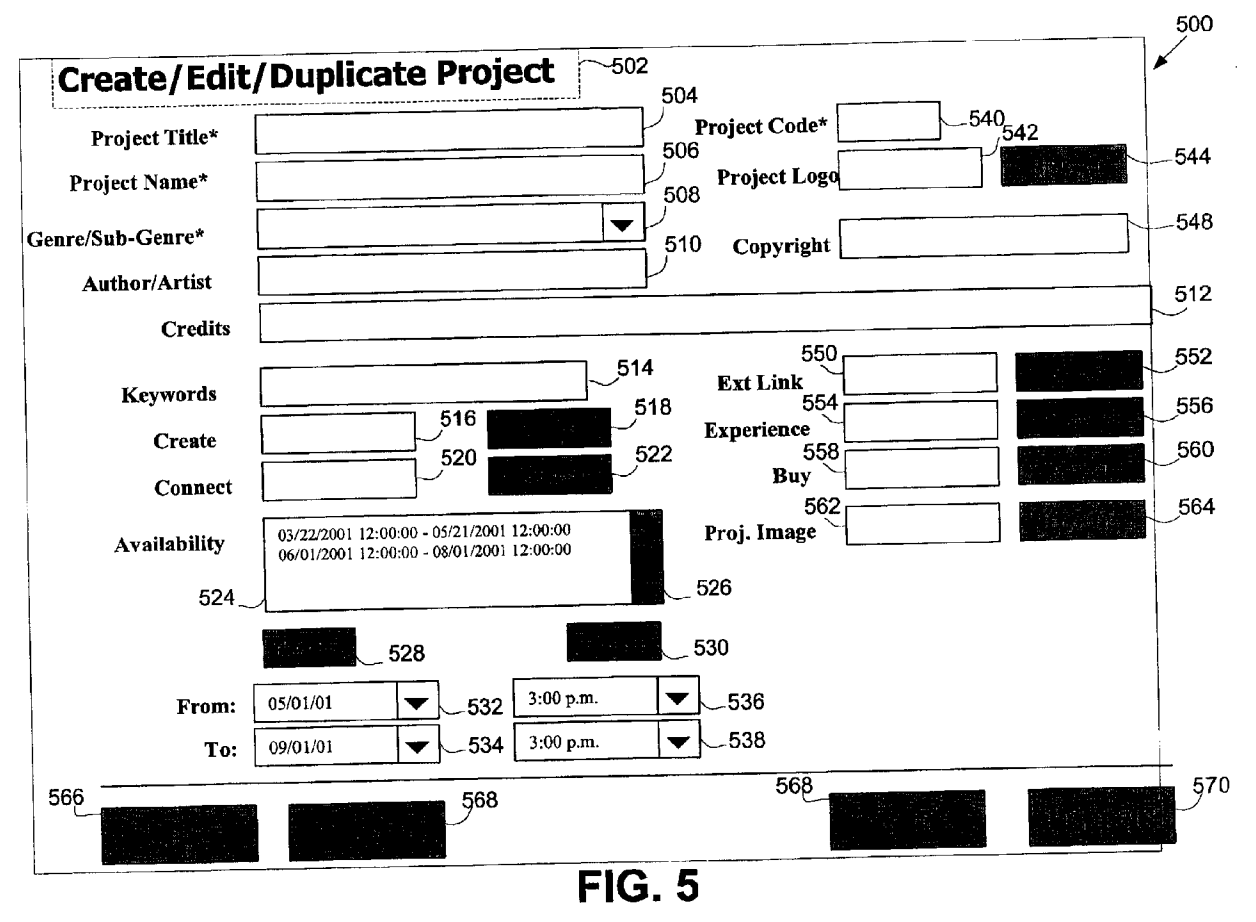

Exemplary "Create/Edit/Duplicate Project" page 500 may then be displayed to the website administrator, as shown in FIG. 5. Create/Edit/Duplicate Project page 500 enables the website administrator to create a new project and enter information (meta-data) about the project. The website administrator may also schedule dates and times that the project may be available on the website. In addition, a currently existing project may be edited or duplicated on Create/Edit/Duplicate Project page 500.

Static text area 502 may display the page description. Meta-data regarding the project title, project name, project creator, project credits, and project copyright may be entered, respectively, in "Project Title" free text entry box 504, "Project Name" free text entry box 506, "Author/Artist" free text entry box 510, "Credits" free text entry box 512, and "Copyright" free text entry box 548.

Meta-data regarding the genre and sub-genre of the project may be selected in "Genre/Sub-genre" pulldown box 508, which when selected may display a list of available genres and sub-genres. Project keyword meta-data may be entered in "Keywords" free text entry box 514. In some embodiments, a project code may be assigned to the project. Meta-data regarding this project code may be entered in "Project Code" free text entry box 540.

A logo image to be associated with the project may be selected from an "image library" accessible through the "Browse" user-selectable operator 544. The filename of the selected logo image may then be displayed in "Project Logo" display box 542. Similarly, an image to be associated with the project may be selected from an "image library" accessible through the "Browse" user-selectable operator 564. The filename of the selected image may then be displayed in "Project Image" display box 562.

An external link to be associated with the project may be selected from a "promote library" accessible through the "Browse" user-selectable operator 552. The link name of the selected promote may then be displayed in "External Link" display box 550. External Links may also be created, edited, or duplicated by selecting "New" under the "External Links" heading on system menu 404. A "Create/Edit/Duplicate External Link" page may be displayed which allows the website administrator to enter, for example, an External Link name, type, description, and URL.

Similarly, an "experience" promote, a "create" promote, a "connect" promote, and a "buy" promote to be associated with the project may be selected from a "promote library" accessible through, respectively, the "Browse" user-selectable operators 556, 518, 522, and 560. The filename of the selected promotes may then be displayed in, respectively, the "Experience" display box 554, the "Create" display box 516, the "Connect" display box 520, and the "Buy" display box 558.

In one embodiment, the website administrator may schedule when the project may be available on the website using pulldown boxes available on Create/Edit/Duplicate Project page 500. The availability start date may be selected from pulldown box 532, which may, when selected, display a calendar with selectable dates. When a start date has been selected, it may appear in pulldown box 532. Similarly, the availability end date may be selected from pulldown box 534. The availability start time may be selected from pulldown box 536, which may, when selected, display a list of selectable times. When a start time has been selected, it may appear in pulldown box 536. Similarly, the availability end time may be selected from pulldown box 538.

Once an availability period (i.e., start and end dates and times) has been selected, the "Add" user-selectable operator 530 may be selected to add the selected availability period to a display box 524 listing the availability periods for the project. In some embodiments, the project may be scheduled to be available during multiple periods. The website administrator may view these periods in display box 524. Vertical scroll bar 526 enables the website administrator to scroll through the availability periods in display box 524. The website administrator may remove particular availability periods by selecting the particular period within display box 524 and selecting the "Remove" user-selectable operator 528.

Figure 6:
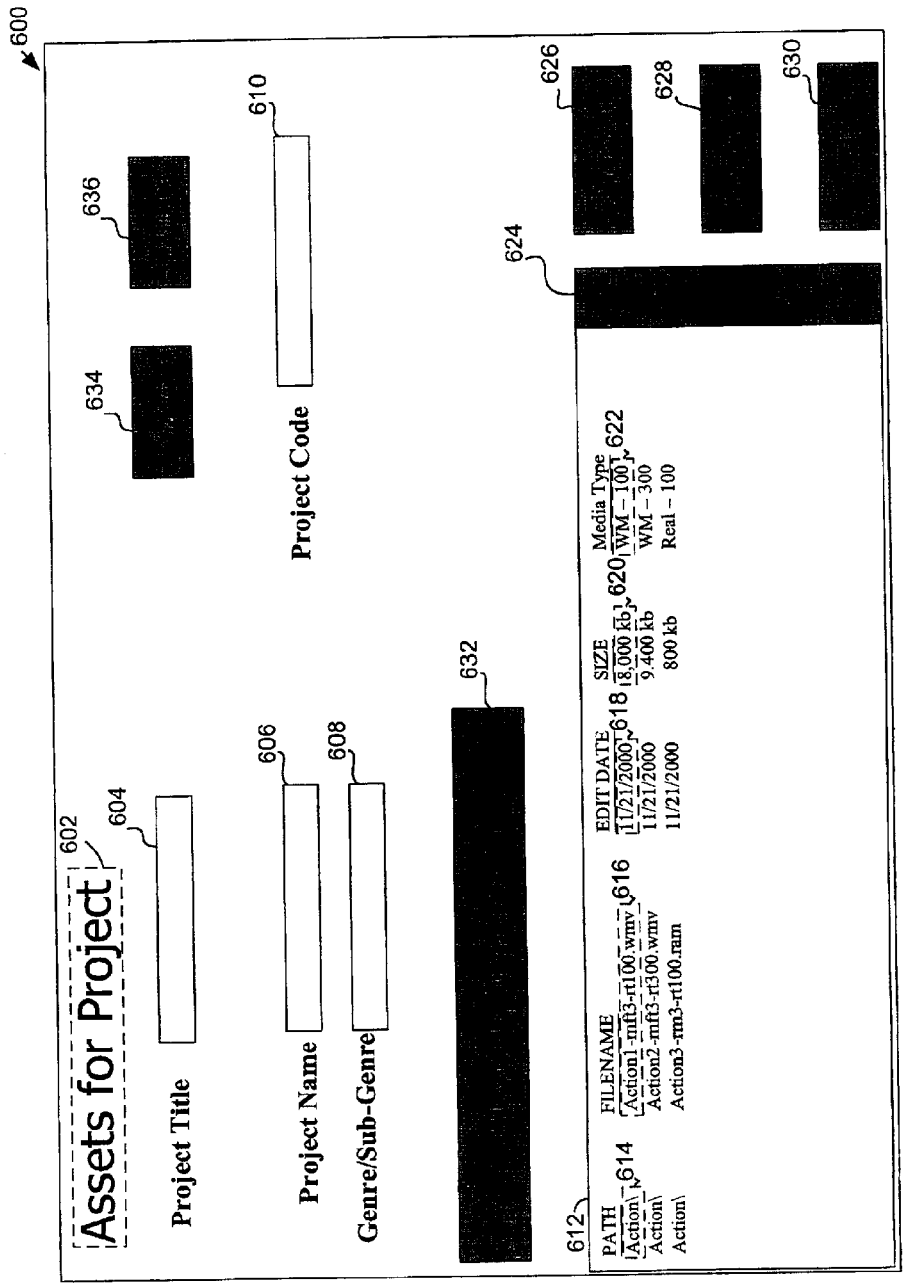
FIG. 6 shows an exemplary content management system Assets for Project page, according to an embodiment of the invention.

The website administrator may associate a media content file ("asset") with the project currently being created by selecting the "Assets" user-selectable operator 568. Exemplary "Assets for Project" page 600 may then be presented to the website administrator, as shown in FIG. 6. The Assets for Project page 600 may display to the website administrator a listing of any assets currently associated with a project, as well as enabling the website administrator to browse an assets library and select assets for association with the project. The website administrator may also upload assets residing on a network drive that were newly created or edited and associated with the project since the last upload.

Static text area 602 may display the page description. "Project Title" display box 604 may display the title of the project currently being created. Similarly, the project name, genre/sub-genre, and code of the project currently being created may be displayed in "Project Name" display box 606, "Genre/Sub-genre" display box 608, and "Project Code" display box 610, respectively. In one embodiment, these display boxes are not editable by the website administrator.

Asset display box 612 shows a listing of asset filenames associated with the current project. Filenames of any assets that have already been selected to be associated with the current project may be displayed here. The asset display box 612 may be empty if the website administrator has not yet selected any assets to be associated with the current project. In one embodiment, several categories of information about the asset filename may be displayed to the website administrator. For example, the file path 614 on the network drive, the filename 616, the edit date 618 for the file, the file size 620, and the file media type 622 (i.e., the media player format) may be displayed. Vertical scroll bar 624 enables the website administrator to scroll through the assets in display box 612.

"Browse" user-selectable operator 626 may enable the website administrator to browse an assets library which may display a listing of assets available to be used with the current project. The website administrator may then select an asset to be associated with the current project. The website administrator may disassociate particular assets from the project by selecting the particular asset within display box 612 and selecting the "Remove" user-selectable operator 628. The website administrator may edit a particular asset by selecting the particular asset within display box 612 and selecting the "Edit" user-selectable operator 630.

"Magic Upload" user-selectable operator 632 may enable the website administrator to upload asset files which may reside outside the database on a network drive and that may have been newly created or edited since the last such upload. In some embodiments, the CMS may also periodically perform this function automatically.

As discussed above, in one embodiment, the asset files may be stored in a database associated with the website. Each asset file within the database may be associated with a unique identifier. The unique identifier may comprise a number of data fields, each data field comprising a number of bits. For example, in one embodiment, the unique identifier comprises 8 data fields, the 8 data fields each comprising from 3 to 6 bits.

Each data field may represent particular types of information about the asset file. For example, one of the data fields may contain the title of the media content. Another data field may, for example, contain the episode number for media content comprising a number of episodes. Yet another data field may represent the file type (for example, audio or video).

In one embodiment, when the website administrator selects the magic upload user-selectable operator 632, the CMS may read and parse the unique identifiers of the ingested assets and assign the assets to the website's live directory based on the information contained in the unique identifiers. The CMS also may, at this time, create a reference file of a particular size (for example, a one kilobyte file) for each uploaded asset, which may be stored in the database and associated with its corresponding ingested asset file. The website administrator may then enter meta-data information regarding each uploaded asset into each corresponding reference file.

When finished associating or disassociating asset files with the current project, the website administrator may select the "Save" user-selectable operator 634 to save any changes and return to the Create/Edit/Duplicate Project page 500. The website administrator may return to the Create/Edit/Duplicate Project page 500 without saving changes by selecting the "Cancel" user-selectable operator 636.

Figure 7:
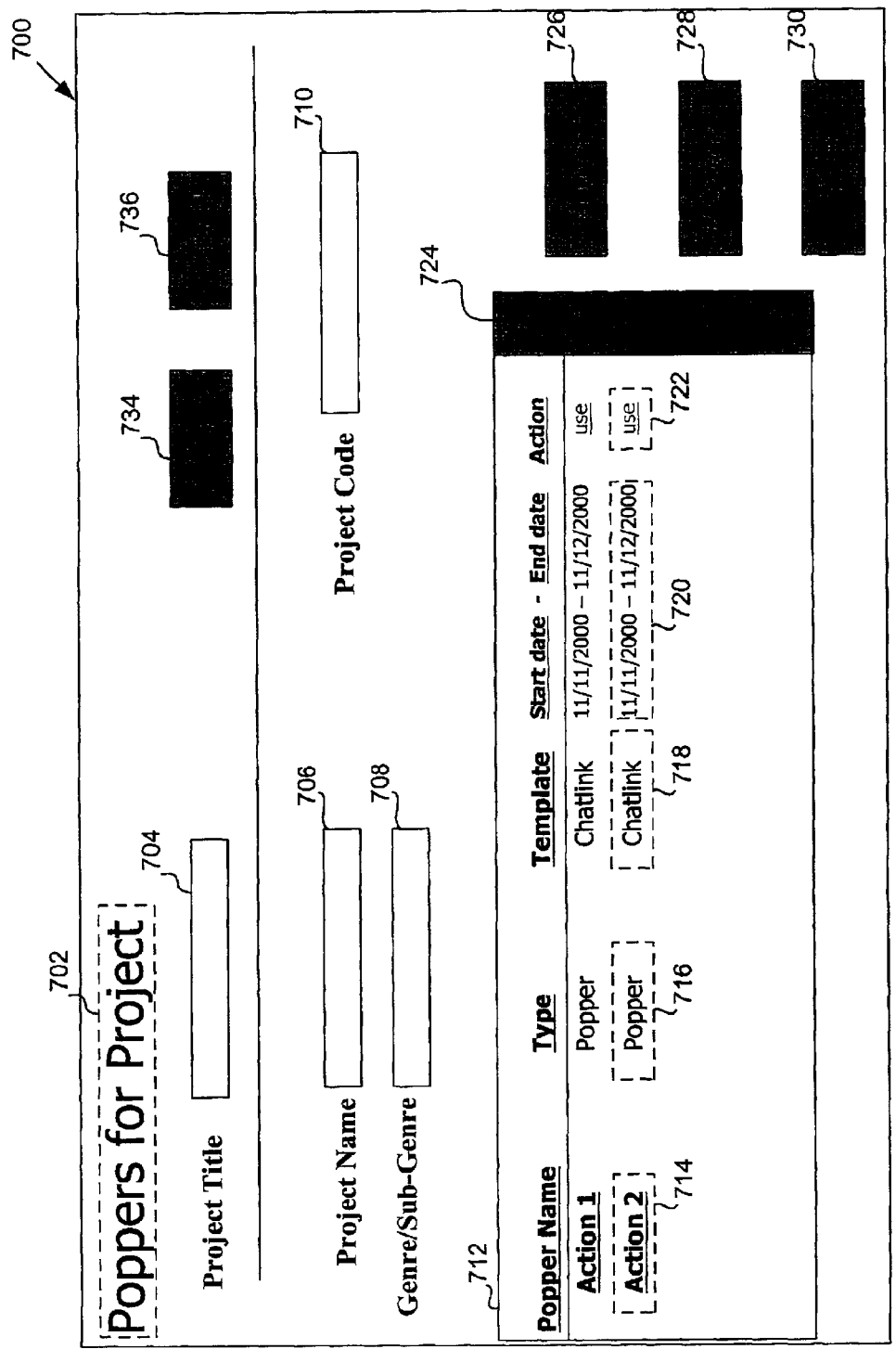
FIG. 7 shows an exemplary content management system Poppers for Project page, according to an embodiment of the invention.

The website administrator may also associate a popper with the project currently being created by selecting the "Poppers" user-selectable operator 570. Exemplary "Poppers for Project" page 700 may then be presented to the website administrator, as shown in FIG. 7. The Poppers for Project page 700 may display to the website administrator a listing of any poppers currently associated with a project, as well as enabling the website administrator to browse a poppers library and select poppers for association with the project.

Static text area 702 may display the page description. "Project Title" display box 704 may display the title of the project currently being created. Similarly, the project name, genre/sub-genre, and code of the project currently being created may be displayed in "Project Name" display box 706, "Genre/Sub-genre" display box 708, and "Project Code" display box 710, respectively. In one embodiment, these display boxes are not editable by the website administrator.

Popper display box 712 shows a listing of poppers associated with the current project. Poppers that have already been selected to be associated with the current project may be displayed here. The popper display box 712 may be empty if the website administrator has not yet selected any poppers to be associated with the current project. In one embodiment, several categories of information about the popper may be displayed to the website administrator. For example, the popper name 714, the popper type 716, the template 718 used to create the popper, the availability start and end dates 720 for the popper, and the action 722 to take (for example, "use" the popper for the project). Vertical scroll bar 724 enables the website administrator to scroll through the poppers in display box 712.

"Browse" user-selectable operator 726 may enable the website administrator to browse a poppers library which may display a listing of poppers available to be used with the current project. The website administrator may then select a popper to be associated with the current project. The website administrator may disassociate particular poppers from the project by selecting the particular popper within display box 712 and selecting the "Remove" user-selectable operator 728. The website administrator may edit a particular popper by selecting the particular popper within display box 712 and selecting the "Edit" user-selectable operator 730.

When finished associating or disassociating poppers with the current project, the website administrator may select the "Save" user-selectable operator 734 to save any changes and return to the Create/Edit/Duplicate Project page 500. The website administrator may return to the Create/Edit/Duplicate Project page 500 without saving changes by selecting the "Cancel" user-selectable operator 736.

When finished creating, editing, or duplicating a project, the website administrator may select the "Save" user-selectable operator 566 to save any changes and return to CMS Global Navigation page 400. The website administrator may return to the CMS Global Navigation page 400 without saving changes by selecting the "Cancel" user-selectable operator 568.

Once the project is created, the CMS may enable the website administrator to search for the project in the database. The project search function may be accessed on the system menu 404 on CMS Global Navigation page 400 by selecting "Find" under the "Project" heading. A "Find Project" page may be presented to the website administrator. Search criteria for the desired project may then be entered. The Search criteria may include, for example, project title, project name, and project genre/sub-genre. The CMS may then perform a search for projects which match the criteria. A results list of projects may then be displayed to the website administrator.

Similarly, the website administrator may search for existing poppers in the database. The popper search function may be accessed on the system menu 404 on CMS Global Navigation page 400 by selecting "Find" under the "Poppers" heading. A "Find Popper" page may be presented to the website administrator. Search criteria for the desired popper may then be entered. The Search criteria may include, for example, popper name, type, or template. The CMS may then perform a search for poppers which match the criteria. A results list of poppers may then be displayed to the website administrator.

In addition to associating a currently existing popper with the project, the website administrator may create, edit, or duplicate a popper by, for example, selecting "New" under the "Poppers" heading on system menu 404. Exemplary "Create/Edit/Duplicate Popper" page 800 may then be displayed to the website administrator, as shown in FIG. 8.

Create/Edit/Duplicate Popper page 800 enables the website administrator to create a new popper and enter information about the popper. The website administrator may also schedule dates and times that the popper may be available on the website. In addition, a currently existing popper may be edited or duplicated on Create/Edit/Duplicate Popper page 800.

Create/Edit/Duplicate Popper page 800 may comprise static text area 802, which may display the page description as well as instructions for entering information about the popper being created, edited, or duplicated. The popper title and name may be entered, respectively, in "Popper Title" free text entry box 804 and "Popper Name" free text entry box 806. "Genre/Sub-Genre" pulldown box 810, when selected, may display a list of available genres/sub-genres. When a genre/sub-genre is selected from the list, it may be displayed in Genre/Sub-Genre pulldown box 810. "Type/Template" pulldown box 812, when selected, may display a list of available types/templates. When a type/template is selected from the list, it may be displayed in Type/Template pulldown box 812.

"Template Description" display box 814 may display, in static text, a description of the type/template selected in Type/Template pulldown box 812. The description may include, for example, the number of assets required for the selected type or template.

In one embodiment, the website administrator may schedule when the popper may be available on the website using pulldown boxes available on Create/Edit/Duplicate Popper page 800. The availability start date may be selected from pulldown box 816, which may, when selected, display a calendar with selectable dates. When a start date has been selected, it may appear in pulldown box 816. Similarly, the availability end date may be selected from pulldown box 820. The availability start time may be selected from pulldown box 818, which may, when selected, display a list of selectable times. When a start time has been selected, it may appear in pulldown box 818. Similarly, the availability end time may be selected from pulldown box 822.

Once an availability period has been selected, the "Add" user-selectable operator 824 may be selected to add the selected availability period to a display box 826 listing the availability periods for the popper. In some embodiments, the popper may be scheduled to be available during multiple periods. The website administrator may view these periods in display box 826. Vertical scroll bar 828 enables the website administrator to scroll through the availability periods in display box 826. The website administrator may remove particular availability periods by selecting the particular period within display box 826 and selecting the "Remove" user-selectable operator 830.

The website administrator may select a project with which to associate the popper from "Project" pulldown box 808. When a project has been selected, it may appear in pulldown box 808. In one embodiment, the CMS enables poppers that have been associated with a project to inherit the meta-data already associated with the project. Thus, once the project has been selected in pulldown box 808, the meta-data already associated with that project, for example, copyright, credits, author/artist, credits, summary, description, project title, file type, file sub-type, project image, and external link may be displayed, respectively, in "Copyright" free text entry box 832, "Credits" free text entry box 834, "Author/Artist" free text entry box 836, "Summary" free text entry box 838, "Description" free text entry box 840, "Project Title" pulldown box 842, "File Type" pulldown box 844, "File Sub-Type" pulldown box 846, "Project Image" pulldown box 848, and "External Link" pulldown box 850. Thus, the website administrator may not need to re-enter this meta-data for the associated popper. The popper meta-data may, however, be edited by the website administrator after the meta-data has been inherited.

"Guide Icon" selection area 852 may allow the website administrator to select an icon to be associated with the popper and to be displayed next to the popper listing in a searchable guide that may be available on the website. The guide icons available may be, for example, a "connect" icon, an "experience" icon, a "create" icon, and a "buy" icon. The guide icon may be selected (for example, by a radio button) based on the type of popper being created, edited, or duplicated. For example, a website shopping popper may have the "buy" icon associated with the popper in the searchable guide.

"Flag" selection area 854 may present a listing of selectable criteria for the popper. For example, in one embodiment, the website administrator may select whether the popper will be browsable, searchable, downloadable, promotable, and/or streamable.

In one embodiment, a project may comprise a show that is episodic (i.e., contains two or more episodes). In addition, a project may contain two or more clips that may appear in a popper. In this embodiment, the episode number may be entered in "Episode Number" free text entry box 856 and "Clip Number" free text entry box 858, respectively.

Figure 9:
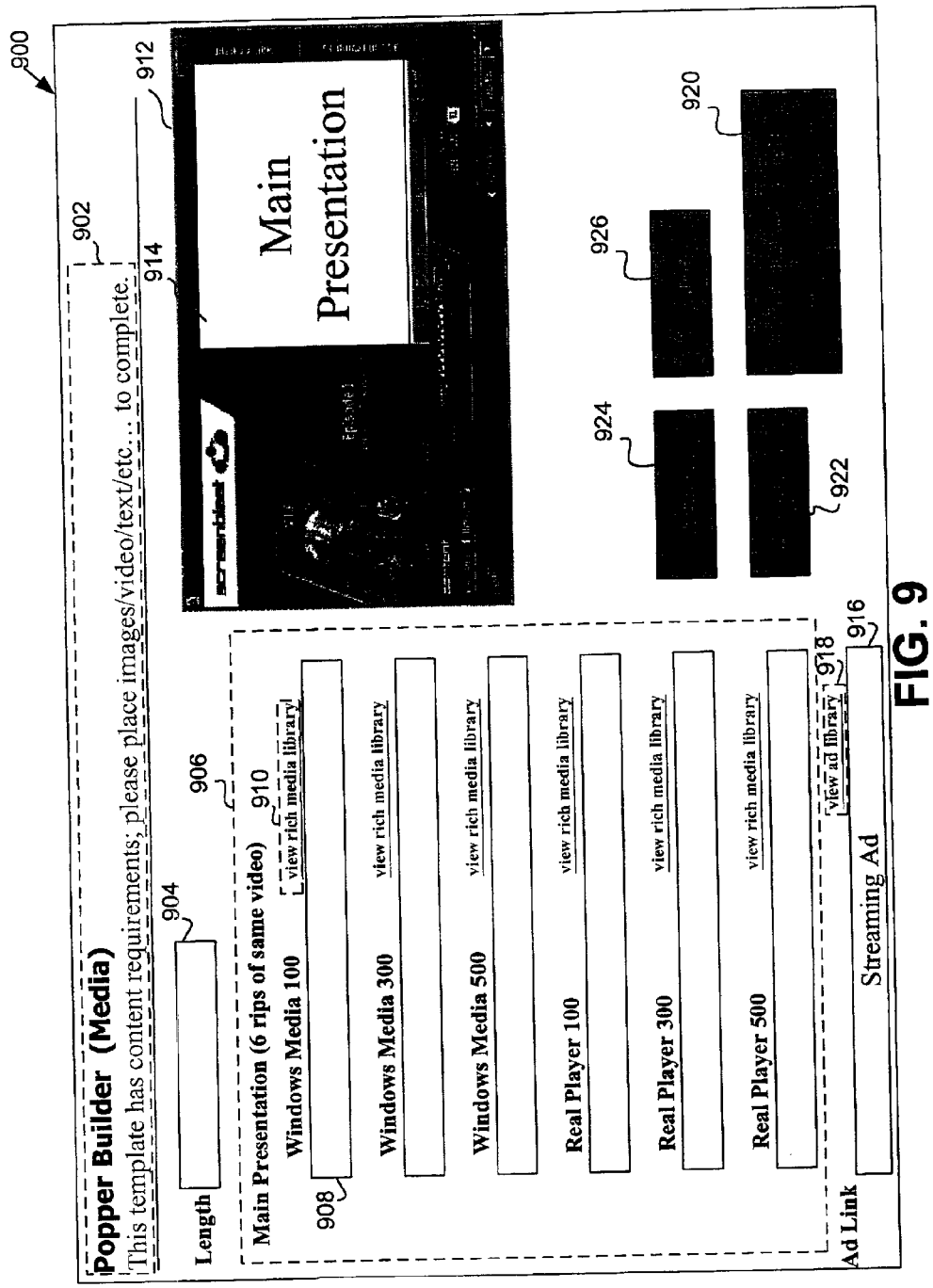
FIG. 9 shows an exemplary content management system Popper Builder page, according to an embodiment of the invention.

"Promotes That Point Here" user-selectable operator 856 may, when selected, display a "Promotes Information" page that may provide a listing of promotes that point to the popper. "Template Elements" user-selectable operator 858 may, when selected, display a "Popper Builder" page 900, as shown in FIG. 9. Popper Builder page 900 may display the particular template chosen in Type/Template pulldown box 812 as well as providing access to assets available for use in the particular popper template.

Exemplary Popper Builder page 900 may comprise static text area 902, which may display the page description and the type of popper template selected (e.g. a media popper), as well as instructions for entering information about the template. Depending on the type of popper template selected, the website administrator may be able to select particular dimensions for the popper. For example, for the media popper template shown in FIG. 9, the website administrator may enter a length for the popper in "Length" free text entry box 904. Other types of popper templates may enable the website administrator to select other dimensions (for example, height and/or width).

"Asset Selection" area 906 may comprise a number of display boxes for which assets may be selected, for example from an asset library. Asset libraries may comprise, for example, "Rich Media" (i.e., graphics rich), "Image," "Advertisement," and "External Link" assets. Each display box may represent, for example, a type of media player, as well as a particular format for that media player.

The media popper may play any one of the listed media player/format combinations depending on the media player and format compatible with, for example, the user network device displaying the popper. Thus, the website administrator may insert an asset into each display box in order to ensure media player compatibility for user network devices having any of the media player/format combinations listed. This "packaging" of multiple pieces of media content into one popper improves the efficiency of the delivery of media content to users of the website, as well as simplifying the programming process.

Thus, a website administrator may enter an asset into Windows Media 100 display box 908 by selecting the "View Rich Media Library" user-selectable operator 910 adjacent to Windows Media 100 display box 908. The Rich Media library may be displayed as a page that lists the Rich Media assets available for the Windows Media 100 media player. When the website administrator has selected an asset, the asset may appear in Windows Media 100 display box 908. The website administrator may then repeat this process for the remaining display boxes in Asset Selection area 906.

Web page representation 912 may be displayed on Popper Builder page 900. Web page representation 912 shows Popper representation 914 within the Web page. Popper representation 914 may show how the media popper may appear on the actual Web page. Thus, the popper in the present example may comprise a media player for playing a Rich Media asset.

In one embodiment, the popper may include an advertisement, for example, a streaming advertisement. Thus, a website administrator may enter an advertisement into "Ad Link" display box 916 by selecting the "View Ad Library" user-selectable operator 918 adjacent to Ad Link display box 916. The Ad library may be displayed as a page that lists the advertisements available for the popper template. When the website administrator has selected an advertisement, the advertisement may appear in Ad Link display box 916. Ad Links may also be created, edited, or duplicated by selecting "New" under the "Ad Links" heading on system menu 404. A "Create/Edit/Duplicate Ad Link" page may be displayed which allows the website administrator to enter, for example, an Ad Link name, type, description, and URL.

Figure 10:
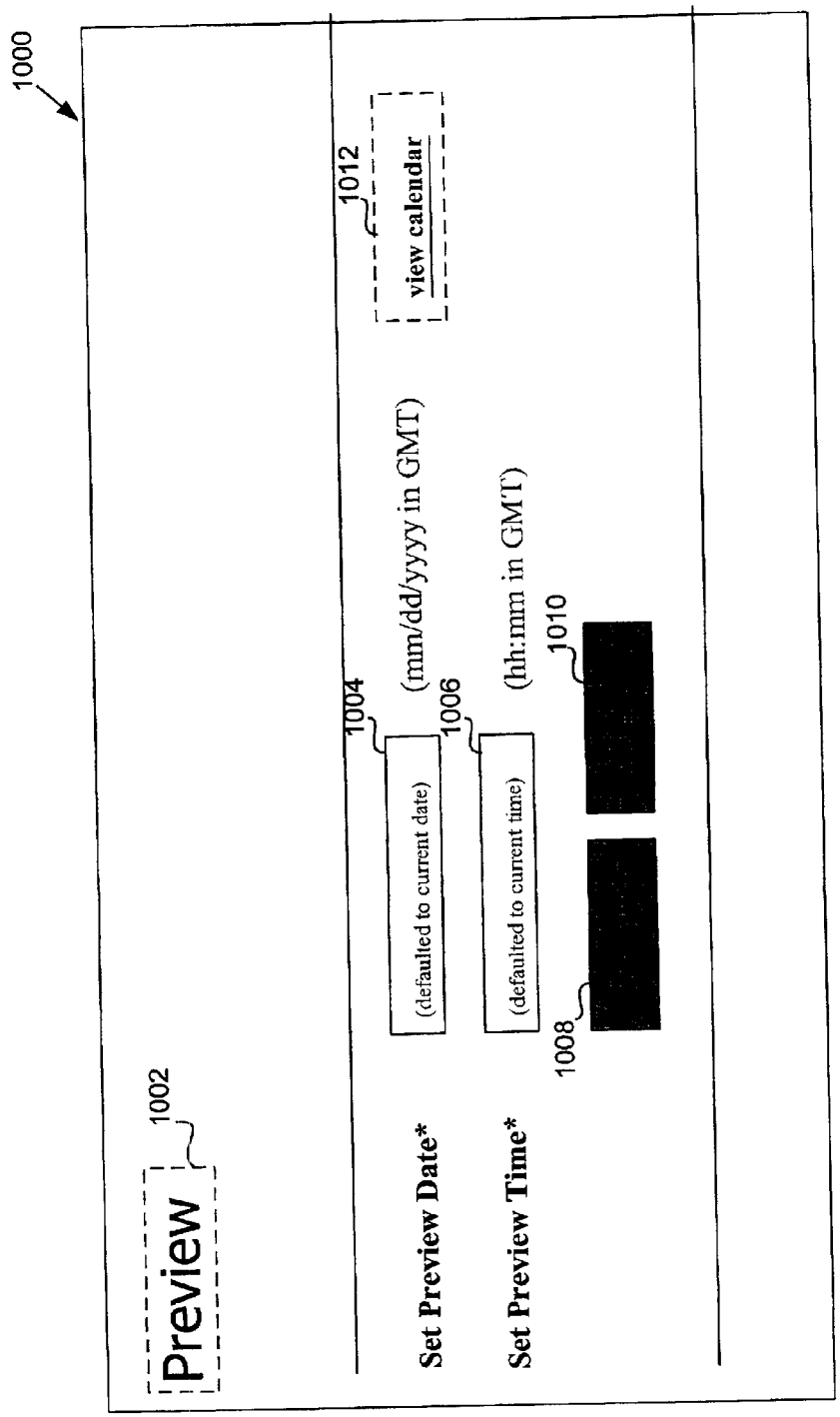
FIG. 10 shows an exemplary content management system Preview page, according to an embodiment of the invention.

"Promotes That Point Here" user-selectable operator 920 may, when selected, display a "Promotes Information" page that may provide a listing of promotes that may point to the popper. "Preview" user-selectable operator 922 may, when selected, display a "Preview" page 1000, as shown in FIG. 10. The Preview page 1000 may enable the website administrator to set a preview date and time and view the popper within the context of the rest of the website at the selected date and time. The preview date may be entered by the website administrator in the "Set Preview Date" free text entry box 1004. The preview time may be entered in the "Set Preview Time" free text entry box 1006. The website administrator may be able to view an availability calendar by selecting "view calendar" user-selectable operator 1012. When the preview date and time have been entered, the website administrator may select the "Preview" user-selectable operator 1008 to preview the popper. The "Cancel" user-selectable operator 1010 may be selected to cancel the preview and return to Popper Builder page 900.

The Preview page 1000 enables the website administrator to set a preview date and time and view the popper within the context of the rest of the website at the selected date and time. The website administrator may, for example, determine if any problems exist in the popper by jumping forward, by means of an internal clock, to the time when the popper is scheduled to be available on the website. Thus, the CMS may facilitate quality assurance ("QA") tasks performed by Website administrators by allowing the administrators to set the internal clock forward to a certain date and time and take a "snapshot" of the website based on that date and time.

When finished previewing the popper, the website administrator may return to the Popper Builder page 900. If satisfied with the popper, the website administrator may select the "Save" user-selectable operator 924 to save any changes and return to the Create/Edit/Duplicate Popper page 800. The website administrator may choose not to save changes and may return to the Create/Edit/Duplicate Popper page 800 by selecting the "Cancel" user-selectable operator 926.

The "Preview" user-selectable operator 864 on Create/Edit/Duplicate Popper page 800 may, when selected, provide the same functionality as described above in relation to "Preview" user-selectable operator 1008. When finished creating, editing, or duplicating a popper, the website administrator may select the "Save" user-selectable operator 860 to save any changes. The website administrator may choose not to save changes by selecting the "Cancel" user-selectable operator 862.

As discussed above, once the popper is created, the CMS may enable the website administrator to search for the popper in the database. The popper search function may be accessed on the system menu 404 on CMS Global Navigation page 400 by selecting "Find" under the "Poppers" heading.

The CMS may enable the website administrator to create a new promote that may be associated with an existing project by, for example, selecting "New" under the"Promotes" heading on system menu 404. Exemplary "Create/Edit/Duplicate Individual Promote" page 1100 may then be displayed to the website administrator, as shown in FIG. 11. Create/Edit/Duplicate Individual Promote page 1100 enables the website administrator to create a new promote and enter information about the promote. In addition, the website administrator may also edit or duplicate an existing promote by using this page.

Create/Edit/Duplicate Individual Promote page 1100 may comprise static text area 1102, which may display the page description as well as instructions for entering information about the promote being created, edited, or duplicated. The "Points To" text box 1104 may display the selected page or popper to which the promote is linked (i.e., to which the promote points). The website administrator may select "view page/popper library" user-selectable operator 1106 to choose a page or popper to which the promote may point from a listing of available pages and poppers.

The website administrator may enter a title for the new, edited, or duplicated promote in "Promote Title" free text entry box 1108. Similarly, the website administrator may enter a name for the new, edited, or duplicated promote in "Promote Name" free text entry box 1110. Rollover text for the promote may be entered in "Rollover Text" free text entry box 1112. This may be the text that may be displayed to the user when, for example, they roll over the promote with a mouse cursor.

In one embodiment, several sizes of promotes are available for use by the website administrator. Examples of the sizes of promotes available include, but are not limited to, "giant," "large," "medium," "small," and "petite." Referring again to FIG. 2, an example of a large promote may be a promote that would fit in content area 202. Promotes 224, 226, 228, and 230 may be examples of small promotes. A giant promote may, for example, fill the entire page.

In addition, in one embodiment, there may be different types of promotes available. Examples of the types of promotes available may include, but are not limited to "Zone" promotes (i.e., a promote which may point to a particular zone page), "Feature" promotes (i.e., a promote which may point to a particular feature or show), and "Related Link" promotes (i.e., a promote which may point to website content related to, for example, the page on which the promote is displayed).

"Promote Type" selection box 1116 may display a user selectable list of the possible sizes and types of promotes. The website administrator may select the desired size and/or type by, for example, selecting a radio button adjacent to the desired selection. If the promote is a related link promote, the website administrator may additionally enter text for the related link in "Related Link Text" free text entry box 1114. The promote may then appear as selectable text rather than an image or other selectable indicia.

An image may be selected for the promote by either entering the filename for the image into "Image" free text entry box 1118 or by selecting "view image library" user-selectable operator 1120 and choosing an image from a list of promote images that may be displayed. Similarly, a rollover image may be selected for the promote by either entering the filename for the rollover image into "Rollover Image" free text entry box 1122 or by selecting "view image library" user-selectable operator 1124 and choosing an image from a list of images that may be displayed.

When finished creating, editing, or duplicating promotes, the website administrator may select the "Save" user-selectable operator 1126 to save any changes. The website administrator may choose not to save changes by selecting the "Cancel" user-selectable operator 1128.

In one embodiment, the CMS enables promotes which point to a page or popper associated with a project to inherit the meta-data already associated with the project. Thus, the website administrator may not need to re-enter the meta-data for the associated promote. The promote meta-data may, however, be edited by the website administrator after the meta-data has been inherited.

Once the promote is created, the CMS may enable the website administrator to search for the promote in the database. The promote search function may be accessed on the system menu 404 on CMS Global Navigation page 400 by selecting "Find" under the "Promote" heading.

A "Find Promotes" page may then be presented to the website administrator. Search criteria for the page or popper to which the promote points may then be entered The Search criteria may include, for example, Page/Popper name, type/template, and availability. The CMS may then perform a search for pages and/or poppers which match the criteria. A results list of pages and/or poppers may then be displayed to the website administrator. An "Edit" user-selectable operator may be associated with each page and/or popper and may be selected in order to access and edit or delete promotes for a particular page or popper. When one of these user-selectable operators is selected, a "Manage Promotes" page may be displayed. In one embodiment, promotes may be edited, deleted, or duplicated on the Manage Promotes page.

Once the project and associated poppers and promotes have been created, the website administrator may create a page and associate the page with the project by, for example, selecting "New" under the "Pages" heading on system menu 404.

Exemplary "Create/Edit/Duplicate Page" page 1200 may then be displayed to the website administrator, as shown in FIG. 12. Create/Edit/Duplicate Page page 1200 enables the website administrator to create a new page and enter information about the page. The website administrator may also schedule dates and times that the page may be available on the website. In addition, the website administrator may also edit or duplicate an existing page here.

Create/Edit/Duplicate Page page 1200 may comprise static text area 1202, which may display the page description as well as instructions for entering information about the page being created, edited, or duplicated. The page title and name may be entered, respectively, in "Page Title" free text entry box 1204 and "Page Name" free text entry box 1206. "Genre/Sub-Genre" pulldown box 1208, when selected, may display a list of available genres/sub-genres. When a genre/sub-genre is selected from the list, it may be displayed in Genre/Sub-Genre pulldown box 1208. "Type/Template" pulldown box 1210, when selected, may display a list of available types/templates. When a type/template is selected from the list, it may be displayed in Type/Template pulldown box 1210.

"Template Description" display box 1212 may display, in static text, a description of the type/template selected in Type/Template pulldown box 1210. The description may include, for example, the number of assets required for the selected type or template. Keywords for the page may be entered in "Keywords" free text entry box 1214.

In one embodiment, the website administrator may schedule when the page may be available on the website using pulldown boxes available on Create/Edit/Duplicate Page page 1200. The availability start date may be selected from pulldown box 1216, which may, when selected, display a calendar with selectable dates. When a start date has been selected, it may appear in pulldown box 1216. Similarly, the availability end date may be selected from pulldown box 1218. The availability start time may be selected from pulldown box 1220, which may, when selected, display a list of selectable times. When a start time has been selected, it may appear in pulldown box 1220. Similarly, the availability end time may be selected from pulldown box 1222.

Once an availability period (i.e., start and end dates and times) has been selected, the "Add" user-selectable operator 1224 may be selected to add the selected availability period to a display box 1226 listing the availability periods for the page. In some embodiments, the page may be scheduled to be available during multiple periods. The website administrator may view these periods in display box 1226. Vertical scroll bar 1228 enables the website administrator to scroll through the availability periods in display box 1226. The website administrator may remove particular availability periods by selecting the particular period within display box 1226 and selecting the "Remove" user-selectable operator 1230.

The website administrator may select a project with which to associate the page from "Project Title" pulldown box 1232. When a project title has been selected, it may appear in pulldown box 1232. In one embodiment, the CMS enables pages that have been associated with a project to inherit the meta-data already associated with the project. Thus, once the project title has been selected in pulldown box 1232, the meta-data already associated with that project, for example, author/artist, credits, summary, description, file type, and file sub-type may be displayed, respectively, in "Author/Artist" free text entry box 1234, "Credits" free text entry box 1236, "Summary" free text entry box 1238, "Description" free text entry box 1240, "File Type" pulldown box 1242, and "File Sub-Type" pulldown box 1242. Thus, the website administrator may not need to reenter the meta-data for the associated page. The page meta-data may, however, be edited by the website administrator after the meta-data has been inherited.

"Guide Icon" selection area 1246 may allow the website administrator to select an icon to be associated with the page and to be displayed next to the page listing in a searchable guide that may be available on the website. The guide icons available may be, for example, a "connect" icon, an "experience" icon, a "create" icon, and a "buy" icon. The guide icon may be selected, for example, by a radio button, based on the type of page being created, edited, or duplicated. For example, a website shopping page may have the "buy" icon associated with the page in the searchable guide.

"Flag" selection area 1248 may present a listing of selectable criteria for the page. For example, in one embodiment, the website administrator may select whether the page will be browsable, searchable, downloadable, promotable, and/or streamable.

Figure 13:
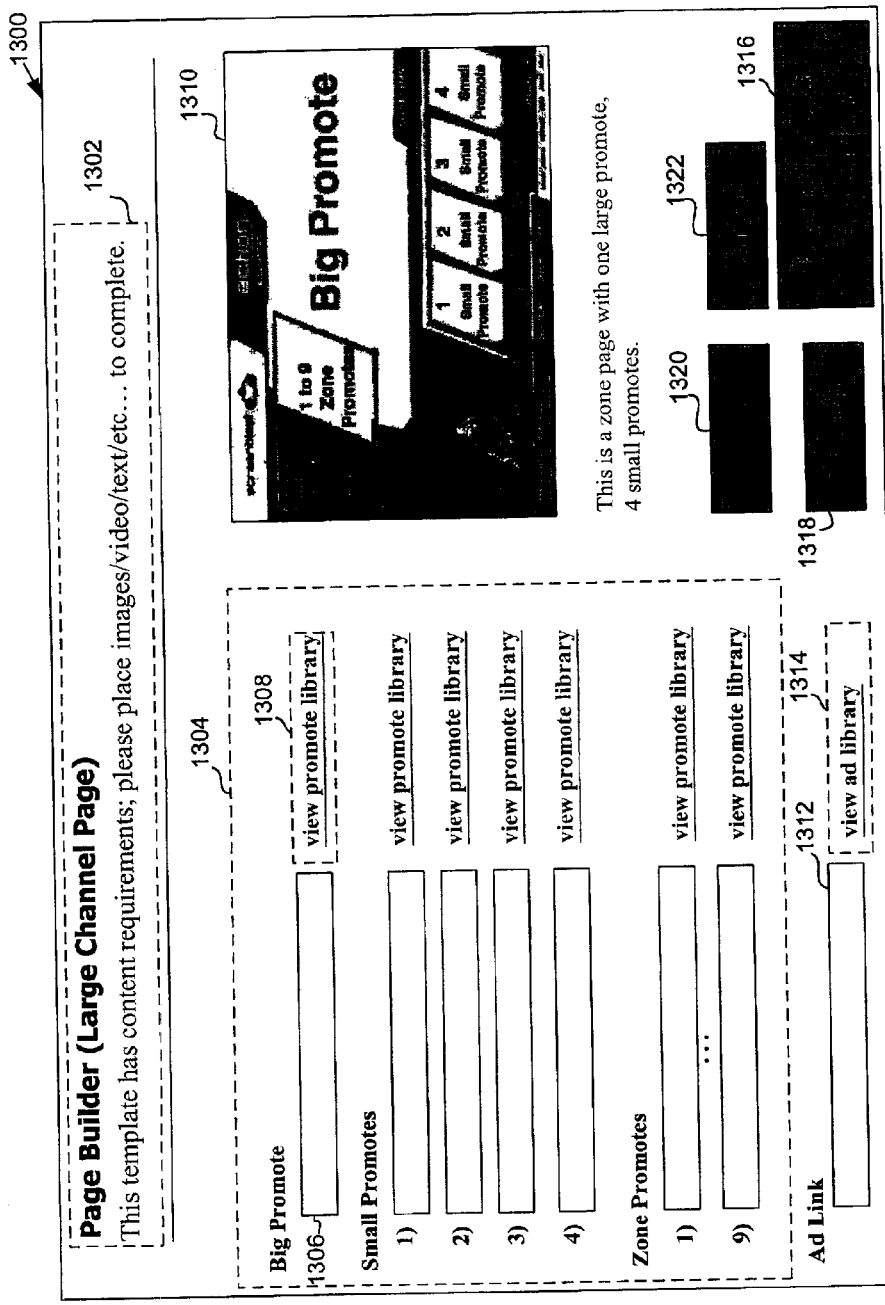
FIG. 13 shows an exemplary content management system Page Builder page, according to an embodiment of the invention.

"Promotes That Point Here" user-selectable operator 1252 may, when selected, display a "Promotes Information" page that may provide a listing of promotes that point to the page. "Template Elements" user-selectable operator 1250 may, when selected, display a "Page Builder" page 1300, as shown in FIG. 13. Exemplary Page Builder page 1300 may display the particular template chosen in Type/Template pulldown box 1210 as well as providing access to promotes available for use in the particular page template.

Page Builder page 1300 may comprise static text area 1302, which may display the page description and the type of page template selected (e.g. a large channel page), as well as instructions for entering information about the template. Promote Selection area 1304 may comprise a number of display boxes for which promotes may be selected, for example from a promote library. Each display box may correspond to a promote in the channel page representation 1310 displayed on Page Builder page 1300.

A website administrator may enter a promote into "Big Promote" display box 1306 by selecting the "view promote library" user-selectable operator 1308 adjacent to Big Promote display box 1306. The Promote library may be displayed as a page that lists the promotes available for the to Big Promote display box 1306. When the website administrator has selected a promote, the promote may appear in Big Promote display box 1306. The website administrator may then repeat this process for the remaining display boxes in Promote Selection area 1304.

In one embodiment, the page may include an advertisement, for example, a streaming advertisement. Thus, a website administrator may enter an advertisement into "Ad Link" display box 1312 by selecting the "View Ad Library" user-selectable operator 1314 adjacent to Ad Link display box 1312. The Ad library may be displayed as a page that lists the advertisements available for the page template. When the website administrator has selected an advertisement, the advertisement may appear in Ad Link display box 1312.

"Promotes That Point Here" user-selectable operator 1316 may, when selected, display a "Promotes Information" page that may provide a listing of promotes that may point to the page. When "Preview" user-selectable operator 1318 or "Preview" user-selectable operator 1258 on Create/Edit/Duplicate Page page 1200 are selected, a "Preview" page 1000, as shown in FIG. 10, may be displayed. Exemplary Preview page 1000 may enable the website administrator to set a preview date and time and view the page within the context of the rest of the website at the selected date and time. The preview date may be entered by the website administrator in the "Set Preview Date" free text entry box 1004. The preview time may be entered in the "Set Preview Time" free text entry box 1006. When the preview date and time have been entered, the website administrator may select the "Preview" user-selectable operator 1008 to preview the page. The "Cancel" user-selectable operator may be selected to cancel the preview and return to Page Builder page 1300 or Create/Edit/Duplicate Page page 1200.

Similarly to the process discussed above in relation to previewing poppers, the Preview page 1000 enables the website administrator to set a preview date and time and view the page within the context of the rest of the website at the selected date and time. The website administrator may, for example, determine if any problems exist in the page by jumping forward, by means of an internal clock, to the time when the page is scheduled to be available on the website. Thus, the CMS may facilitate quality assurance ("QA") tasks performed by Website administrators by allowing the administrators to set the internal clock forward to a certain date and time and take a "snapshot" of the website based on that date and time.

When finished previewing the page, the website administrator may return to the Page Builder page 1300. If satisfied with the page, the website administrator may select the "Save" user-selectable operator 1320 to save any changes and return to the Create/Edit/Duplicate Page page 1200. The website administrator may choose not to save changes and may return to the Create/Edit/Duplicate Page page 1200 by selecting the "Cancel" user-selectable operator 1322.

When finished creating, editing, or duplicating a page, the website administrator may select the "Save" user-selectable operator 1254 to save any changes. The website administrator may choose not to save changes by selecting the "Cancel" user-selectable operator 1256.

Once the page is created, the CMS may enable the website administrator to search for the page in the database. The page search function may be accessed on the system menu 404 on CMS Global Navigation page 400 by selecting "Find" under the "Pages" heading.

A "Find Page/Page Scheduler" page may then be presented to the website administrator. Search criteria for the page may then be entered. The Search criteria may include, for example, the page name, the title of the project with which the page is associated, the page genre/sub-genre, page availability, and page template. The CMS may then perform a search for pages which match the criteria. A results list of pages may then be displayed to the website administrator. Several different user-selectable operators may be selectable for each page in the results list. For example, "Edit," "Delete," "Duplicate," "New Version," and "Preview" user-selectable operators may be available for performing functions on the selected page. When the Edit, Delete, Duplicate, or New Version user-selectable operators are selected, a "Page Information" page may be displayed. In one embodiment, pages may be edited, deleted, or duplicated on the Page Information page. New versions of the page may also be created on this page.

CMS Approval And Generation Process

In one embodiment, the CMS may have multiple "approval" levels for the various website elements. Website administrators may have different access levels which may allow them to only approve a website element at a certain level. Example approval levels that may be available are "Incomplete," "Complete," "User Approved," "Producer approved," "Quality Assurance approved," and "Manager Approved." These hierarchical approval levels may improve the quality and security of the website content managed by the CMS.

As an example of the approval process, when a website element, for example, a page, is created, the page begins with an approval status of Incomplete. When the page has been created, as described above, the page may graduate to a Complete status. A website administrator with an access level that enables the administrator to designate a website element as User Approved may then do so.

The created page may then be submitted to a website producer with an access level that enables the producer to designate a website element as Producer Approved. In the next stage, the created page may then be submitted to a website QA team with an access level that enables the QA team to designate a website element as QA Approved. Finally, the created page may be submitted to a website manager with an access level that enables the manager to designate a website element as Manager Approved. In one embodiment, only when a website element has been Manager Approved may the website element, for example, channel page 200, be generated.

In one embodiment, as each website element is created and Manager Approved, the element is generated. Generation refers to the process of producing and linking together the associated website elements which conform to the information and meta-data which was entered during the creating, editing, or duplicating of a website element by a website administrator through the CMS.

Each website element may be created and generated individually. For example, in the process described above in relation to the creation of channel page 200, a project was first created and generated. Then poppers were created, associated with the project through the meta-data, and generated. Then promotes that are linked to, for example, the poppers, were created, associated with the project through the meta-data, and generated. Finally, channel page 200 was created, associated with the project through the meta-data, and generated. Thus, channel page 200 packages together all the associated website elements, upward through the hierarchy, to the project level.

In one embodiment, the generation of all the website elements, including the channel page 200, may be performed offline. Then the pre-generated elements may be scheduled, through the CMS, to be available on-line at certain times.

Thus, a pre-generated channel page 200 may be available on-line at its scheduled times. Therefore, when channel page 200 is available on-line, a website user may access it with a faster access time, because the page may not have to be dynamically generated on-line while the user waits.

Thus, it can be seen that embodiments of the content management system and process described above enable the website administrator to more easily and efficiently program, schedule, and manage website elements including, but not limited to projects, poppers, promotes, and pages. Furthermore, it can be seen that embodiments of the content management system and process described above manage website elements by attaching meta-data to a website project during creation of the project. The project meta-data is then inherited by website elements associated with the project. The website elements are then sorted into a hierarchy based on the meta-data.

In addition, it can be seen that embodiments of the content management system and process described above enable website administrators to approve website elements based on hierarchical approval levels. The website elements may be generated after being approved at the highest level.

Furthermore, it can be seen that embodiments of the content management system and process described above generate, off-line, a Web page which automatically ties together, through the project meta-data, all the various child elements associated with the parent project. The data representing display code for the various parent and child elements may be linked together by the content management system into a "data package" by means of the meta-data. This packaging by meta-data facilitates the off-line dynamic generation of website pages which include various linked elements.

Furthermore, it can be seen that embodiments of the content management system and process described above enable website administrators to set an internal clock forward in order to take a snapshot of the website at a future time. Thus, website quality assurance personnel may check the website elements within the context of the website and may ensure that the generated website elements may function and interact properly when they actually become available on the website at their scheduled times.

In addition, it can be seen that embodiments of the content management system and process described above automatically upload and ingest media content based on a naming convention. Furthermore, the content management system may ingest a website user's media content into a database while attaching meta-data to the website user's media content. The content management system may, in addition, upload and store a website user's media content to a database by assigning a random number to the media content.

The embodiments of the content management system and process described above focus on implementations for a network server computer system accessible through the World Wide Web and the Internet as a website (referred to as the "website"). However, many or all of the systems and processes described may be readily adapted to other data connections as well, including, but not limited to, other Internet connection interfaces (for example, an FTP server), private networks (for example, a network provided by an ISP for its subscribers), and direct connections (such as a directly wired set of stations in a limited area such as a hotel, office building, educational facility or the like).

In addition, implementations are described in which a website user accesses the website using a computer system, which may be a personal computer system or other suitable computer system. However, many or all of the systems and processes described may be readily adapted to other UNDs employed to access and download data through a server, including, but not limited to, a television with a connected or internal cable modem and hard disk, personal digital assistants (PDAs), media players, mobile telephone devices, or any other suitable network enabled device with a storage device for storing content and/or display mechanism for playing or displaying media content to the user.

Various embodiments of the present invention may include one or more of the features and functions described above. One example embodiment includes all the features and functions described above.

These and other objects, features, and advantages of embodiments of the invention will be apparent to those skilled in the art from the foregoing detailed description of embodiments of the invention, when read with the drawings and appended claims. It is to be understood that even though numerous characteristics and advantages of embodiments of the present invention have been set forth in the foregoing description, together with details of the structure and function of embodiments of the invention, this disclosure is illustrative only. Changes may be made in detail, especially matters of structure and management of parts within the principles of the present invention to the full extent indicated by the broad general meaning of the terms in which the appended claims are expressed.

Having disclosed exemplary embodiments and the best mode, modifications and variations may be made to the disclosed embodiments while remaining within the scope of the invention as defined by the following claims.

What is claimed is:

1. A non-hierarchical user file system, comprising:
   a storage device;
   a user file storage area; and
   a processor programmed to:
      upload a file from the storage device;
      generate a unique identification number;
      associate the unique identification number with the file; and
      store the file in the user file storage area;
   wherein files are stored in the user file storage area in a non-hierarchical manner based on the unique identification number; and
   wherein the processor is further programmed to:
      store and maintain content in the storage device;
      sort the content into a hierarchy;
      attach meta-data to selected high-level content within the hierarchy;
      pass the meta-data from the selected high-level content to selected low-level content within the hierarchy, the selected low-level content thereby becoming associated with the selected high-level content;
      integrate associated high-level and low-level content into a data package; and
      generate a display of the data package for display on a display device.

2. The system recited in claim 1, wherein the processor is further programmed to sort the content according to the meta-data.

3. The system recited in claim 1, wherein the display device is connected locally to the processor.

4. The system recited in claim 1, further comprising at least one server network device, the at least one server network device communicating with the processor and being programmed to provide a user interface; and at least one user network device communicatively coupled to the at least one server network device via a network, the at least one user network device being programmed to access the user interface.

5. The system recited in claim 4, wherein the display device is connected locally to the at least one user network device.

6. The system recited in claim 1, wherein the content comprises at least one of projects, poppers, promotes, and pages.

7. The system recited in claim 6, wherein the meta-data comprises information about at least one of the projects, the poppers, the promotes, and the pages.

8. The system recited in claim 7, wherein the information comprises at least one of a name, a title, an artist's name, an author's name, credits, keywords, a description, a file type, copyright information, and a summary.

9. The system recited in claim 4, wherein the network comprises the Internet and the user interface comprises a website.

10. The system recited in claim 9, wherein the high-level and low-level content are integrated into the data package off-line.

11. The system recited in claim 9, wherein the data package is displayed on-line via the website.

12. The system recited in claim 10, wherein the data package comprises at least one of a Web page, a popper, and a promote.

13. The system recited in claim 12, wherein the Web page is programmed in Flash.

14. The system recited in claim 12, wherein the promote comprises a graphic image.

15. The system recited in claim 12, wherein the promote comprises a text link.

16. The system recited in claim 12, wherein the Web page comprises at least one promote, the at least one promote being linked to at least one of media content, a page, a popper, an advertisement, and an external link.

17. The system recited in claim 16, wherein the external link is selectable for linking to a website.

18. The system recited in claim 16, wherein the media content comprises at least one of audio, video, photos, animation, and music.

19. The system recited in claim 16, wherein the popper comprises a media player for playing media content.

20. A non-hierarchical user file system, comprising:
a storage device;
a user file storage area; and
a processor programmed to;
  unload a file from the storage device;
  generate a unique identification number;
  associate the unique identification number with the file; and
  store the file in the user file storage area;
wherein files are stored in the user file storage area in a non-hierarchical manner based on the unique identification number; and
wherein the processor is further programmed to provide a user interface, comprising:
a project creating page, comprising:
  means for creating a project;
  means for attaching meta-data to the created project;
  means for browsing a library of assets, the assets being selectable for association with the created project;
  means for browsing a library of poppers, the poppers being selectable for association with the created project;
  means for browsing a library of links, the links being selectable for association with the created project;
  means for scheduling the created project;
  means for saving the created project in the user, file storage area.

21. The system recited in claim 20, wherein the user interface further comprising:
  means for approving the created project; and
  means for generating the created project.

22. The system recited in claim 20, wherein the user interface further comprising:
a popper creating page, comprising:
  means for selecting a template for creating a popper;
  means for creating the popper;
  means for associating the created popper with the created project;
  means for associating at least one media player with the created popper;
  means for scheduling the created popper;
  means for previewing the created popper; and
  means for saving the created popper;
wherein the created popper inherits the meta-data attached to the created project.

23. The system recited in claim 22, wherein the user interface further comprising:
  means for approving the created popper, and
  means for generating the created popper.

24. The system recited in claim 22, wherein the means for previewing the created popper further comprise:
  means for setting forward an internal clock to a time when the created popper is scheduled; and
  means for viewing the popper at the set time.

25. The system recited in claim 22, wherein the user interface further comprising: means for associating together in a data package at least two media players; and
  means for associating the data package with the created popper.

26. The system recited in claim 25, wherein the means for associating together in a data package at least two media players further comprise means for associating the at least two media players through meta-data.

27. The system recited in claim 22, wherein the user interface further comprising:
a promote creating page, comprising:
  means for creating a promote;
  means for browsing a library of pages and poppers, the pages and poppers being associated with the meta-data and being selectable for association with the created promote;
  means for browsing a library of images, the images being selectable for association with the created promote; and
  means for saving the created promote;
wherein the created promote inherits the meta-data from the associated pages and poppers.

28. The system recited in claim 27, wherein the user interface further comprising:
  means for approving the created promote; and
  means for generating the created promote.

29. The system recited in claim 27, wherein the user interface further comprising:
a page creating page, comprising:
  means for selecting a template for creating a page;
  means for creating the page;
  means for associating the created page with the created project;

means for associating the created page with at least one promote, the at least one promote being associated with at least one of a page, a popper, and a link;
means for scheduling the created page;
means for previewing the created page; and
means for saving the created page;
wherein the created page inherits the meta-data attached to the created project.

30. The system recited in claim 29, wherein the user interface further comprising:
means for approving the created page; and
means for generating the created page.

31. The system recited in claim 29, wherein the means for previewing the created page further comprise:
means for setting forward an internal clock to a time when the created page is scheduled; and
means for viewing the created page at the set time.

32. The system recited in claim 29, wherein the user interface further comprising means for editing and duplicating at least one of a project, a popper, a promote, and a page.

33. The system recited in claim 29, wherein the user interface further comprising means for searching for at least one of a project, a popper, a promote, and a page.

34. The system recited in claim 29, wherein the user interface further comprising:
an asset page, comprising:
means for associating an asset with the created project;
means for disassociating an asset from the created project;
means for browsing a library of assets, the assets being selectable for association with the created project; and
means for ingesting outside assets;
wherein the outside assets are ingested based on a naming convention.

35. The system in claim 34, wherein the means for ingesting the outside assets further comprise a "magic upload" user-selectable operator.

36. The system in claim 34, wherein the naming convention comprises a plurality of data fields, each of the plurality of data fields representing a type of the meta-data and comprising a plurality of bits.

37. A non-hierarchical user file system, comprising:
a storage device;
a user file storage area; and
a processor programmed to:
upload a file from the storage device;
generate a unique identification number;
associate the unique identification number with the file; and
store the file in the user file storage area;
wherein files are stored in the user file storage area in a non-hierarchical manner based on the unique identification number; and
wherein the processor is further programmed to:
associate with a modified file a unique identifier;
store the modified file in the storage device;
search the storage device periodically for the modified file;
access the modified file on the storage device;
read and parse the unique identifier associated with the modified file;
assign the modified file to the user storage area based on the unique identifier;
create a reference file, the reference file comprising meta-data associated with the modified file; and
store the reference file in the user storage area.

38. The system recited in claim 37, wherein the modified file comprises at least one of a newly created file and a newly edited file.

39. A process for organizing content into a hierarchy, comprising:
creating a project;
attaching meta-data to the created project;
browsing a library of assets, the assets being selectable for association with the created project;
selecting at least one asset for association with the created project;
scheduling the created project;
saving the created project;
browsing a library of poppers, the poppers being selectable for association with the created project; and
selecting a popper for association with the created project.

40. A process for organizing content into a hierarchy, comprising:
creating a project;
attaching meta-data to the created project;
browsing a library of assets, the assets being selectable for association with the created project;
selecting at least one asset for association with the created project;
scheduling the created project;
saving the created project;
approving the created project; and
generating the created project.

41. A process for organizing content into a hierarchy, comprising:
creating a project;
attaching meta-data to the created project;
browsing a library of assets, the assets being selectable for association with the created project;
selecting at least one asset for association with the created project;
scheduling the created project;
saving the created project;
selecting a template for creating a popper;
creating the popper;
associating the created popper with the created project; and
saving the created popper;
wherein the created popper inherits the meta-data attached to the created project.

42. The process recited in claim 41, further comprising: scheduling the created popper; and previewing the created popper.

43. The process recited in claim 41, further comprising: approving the created popper; and generating the created popper.

44. The process recited in claim 42, wherein previewing the created popper comprises:
setting forward an internal clock to a time when the created popper is scheduled; and
viewing the created popper at the set time.

45. The process recited in claim 41, further comprising associating at least one media player with the created popper.

46. The process recited in claim 45, further comprising:
associating together in a data package at least two media players; and
associating the data package with the created popper.

47. The process recited in claim 46, wherein associating together in a data package at leas two media players comprises associating the at least two media players through the meta-data.

48. A process for organizing content into a hierarchy, comprising:
creating a project;
attaching meta-data to the created project;
browsing a library of assets, the assets being selectable for association with the created project;
selecting at least one asset for association with the created project;
scheduling the created project;
saving the created project;
creating a project;
browsing a library of pages and poppers, the pages and poppers being associated with the meta-data and being selectable for association with the created promote;
selecting at least one of page and popper for association with the created promote; and
saving the created promoted;
wherein the created promoted inherits the meta-data from the associated pages and poppers.

49. The process recited in claim 48, further comprising:
browsing a library of images, the images being selectable for association with the created promote; and
selecting an image for association with the created promote.

50. The process recited in claim 48, further comprising:
approving the created promote; and
generating the created promote.

51. A process for organizing content into a hierarchy, comprising:
creating a project;
attaching meta-data to the created project;
browsing a library of assets, the assets being selectable for association with the created project;
selecting at least one asset for association with the created project;
scheduling the created project;
saving the created project;
selecting a template for creating a page;
creating the page;
associating the created page with the created project;
associating the created page with at least one promote, the at least one promote being associated with at least one of a page, a popper, and a link; and
saving the created page;
wherein the created page inherits the meta-data attached to the created project.

52. The process recited in claim 51, further comprising:
scheduling the created page; and
previewing the created page.

53. The process recited in claim 51, further comprising:
approving the created page; and
generating the created page.

54. The process recited in claim 52, wherein previewing the created page further comprises:
setting forward an internal clock to a time when the created page is scheduled; and
viewing the created page at the set time.

55. The process recited in claim 51, further comprising at least one of editing and duplicating at least one of a project, a popper, a promote, and a page.

56. The process recited in claim 51, further comprising searching for at least one of a project, a popper, a promote, and a page.

57. The process recited in claim 51, further comprising:
browsing a library of assets, the assets being selectable for association with the created project; and
selecting an asset for association with the created project.

58. A system for organizing content relating to a created project into a hierarchy, comprising at least one processor programmed to:
attach meta-data to the created project;
provide a library of assets, the assets being selectable for association with the created project;
providing means that allow a user to select at least one asset for association with the created project;
schedule the created project; and
save the created project;
wherein the at least one processor is further programmed for:
providing a library of poppers, the poppers being selectable for association with the created project; and
providing means that allow a user to select a popper for association with the created project.

59. A system for organizing content relating to a created project into a hierarchy, comprising at least one processor programmed to:
attach meta-data to the created project;
provide a library of assets, the assets being selectable for association with the created project;
providing means that allow a user to select at least one asset for association with the created project;
schedule the created project; and
save the created project;
wherein the at least one processor is further programmed for:
providing selectable templates for creating a popper;
creating a popper based on a selected template;
associating the created popper with the created project; and
saving the created popper;
wherein the created popper inherits the meta-data attached to the created project.

* * * * *